(12) United States Patent
Nagura et al.

(10) Patent No.: US 6,417,487 B2
(45) Date of Patent: Jul. 9, 2002

(54) LASER BEAM MACHINING HEAD

(75) Inventors: Yasumi Nagura; Michisuke Nayama; Takashi Ishide; Yoshio Hashimoto; Yukio Michishita, all of Takasago; Koji Okimura, Kobe, all of (JP)

(73) Assignee: Mitsubishi Heavy Industries, Ltd., Tokyo (JP)

(*) Notice: Subject to any disclaimer, the term of this patent is extended or adjusted under 35 U.S.C. 154(b) by 0 days.

(21) Appl. No.: 09/920,823

(22) Filed: Aug. 3, 2001

Related U.S. Application Data

(62) Division of application No. 09/429,079, filed on Oct. 29, 1999, now Pat. No. 6,294,754.

(30) Foreign Application Priority Data

Jun. 8, 1998 (JP) .......................... 10-159022
Jan. 14, 1999 (JP) .......................... 11-007999

(51) Int. Cl.$^7$ .................. B23K 26/14; B23K 26/067
(52) U.S. Cl. .................. 219/121.84; 219/121.77
(58) Field of Search ............... 219/121.84, 121.76, 219/121.77, 121.67, 121.68, 121.7

(56) References Cited

U.S. PATENT DOCUMENTS

| | | | |
|---|---|---|---|
| 4,167,662 A | 9/1979 | Steen | 219/121.84 |
| 4,315,130 A | 2/1982 | Inagaki et al. | 219/121.77 |
| 5,651,904 A | * 7/1997 | Franke et al. | 219/121.84 |
| 6,034,343 A | 3/2000 | Hashimoto et al. | 219/121.63 |
| 6,172,323 B1 | 1/2001 | Ishide et al. | 219/121.63 |

FOREIGN PATENT DOCUMENTS

| | | | |
|---|---|---|---|
| JP | 54-39340 | | 3/1979 |
| JP | 59-218292 | * | 12/1984 |
| JP | 4-182088 A | | 6/1992 |
| JP | 6-190578 | * | 7/1994 |
| JP | 8-108289 A | | 4/1996 |

* cited by examiner

*Primary Examiner*—Geoffrey S. Evans

(57) ABSTRACT

A laser beam machining head includes a dividing optical system for dividing laser light into two separate laser beams, and providing spacing therebetween; a condensing optical system for condensing the separate laser beams into condensed laser light, and projecting it onto a cutting site of an object to be cut; and an inner assist gas nozzle placed between the separate laser beams, a width of an opening of a tip portion of the inner assist gas nozzle being nearly equal to a cutting width. Or the tip opening of the inner assist gas nozzle is slender; or its tip side is inclined, and the angle of inclination is variable; or the relative positions of the inner assist gas nozzle and a workpiece, or the relative positions of the focal position of the condensing optical system and the workpiece are variable independently; or an outer assist gas nozzle surrounding the separate laser beams is provided.

10 Claims, 27 Drawing Sheets

121 Laser beam machining head
122 Object to be cut
122a Cutting site
123 Lens-barrel
124 Condensing optical system
125 Protective glass
126 Laser light
126a Separate laser beam
126b Separate laser beam
128 Lens
132 Outer assist gas nozzle
132a Tip opening
133 Assist gas supply pipe
134 Inner assist gas nozzle
134a Tip opening
$Q_{1T}$ Assist gas
$Q_{2T}$ Assist gas
f Focal position 2 Convex roof mirror
3 Concave roof mirror
21 Filler wire-coaxial laser welding head
201 Optical fiber
204 Imaging lens system
206 Laser beam
207 Filler wire
208 Filler wire feed pipe
216 Base material 2 Convex roof mirror
3 Concave roof mirror
15 Optical fiber drive shaft
22 TIG arc-coaxial laser welding head
201 Optical fiber
204 Imaging lens system
206 Laser beam
210 Electrode
211 Electrode holding pipe
216 Base material 2 Convex roof mirror
3 Concave roof mirror
201 Optical fiber
204 Imaging lens system
206 Laser beam
207 Filler wire (211 Electrode holding pipe)

2 Convex roof mirror
3 Concave roof mirror
17 Filler wire guide
201 Optical fiber
204 Imaging lens system
206 Laser beam
207 Filler wire
208 Filler wire feed pipe 17 Filler wire guide
206 Laser beam
207 Filler wire 17 Filler wire guide
17a 17b 17c Separate pieces
207 Filler wire 2 Convex roof mirror
3 Concave roof mirror
18 Water flow pipe
201 Optical fiber
204 Imaging lens system
206 Laser beam
210 Electrode
216 Base material 18 Water flow pipe
206 Laser beam
210 Electrode 18 Water flow pipe
210 Electrode
211 Electrode holding pipe 206 Laser beam
210 Electrode
211 Electrode holding pipe 121 Laser beam machining head
122 Object to be cut
122a Cutting site
123 Lens-barrel
124 Condensing optical system
125 Protective glass
126 Laser light
126a Separate laser beam
126b Separate laser beam
128 Lens
132 Outer assist gas nozzle
132a Tip opening
133 Assist gas supply pipe
134 Inner assist gas nozzle
134a Tip opening
$Q_{1T}$ Assist gas
$Q_{2T}$ Assist gas
f Focal position 126a Separate laser beam
126b Separate laser beam
132 Outer assist gas nozzle
133 Assist gas supply pipe
134 Inner assist gas nozzle 122 Object to be cut
122a Cutting site
126a Separate laser beam
126b Separate laser beam
132 Outer assist gas nozzle
132a Tip opening
134 Inner assist gas nozzle
134a Tip opening 122 Object to be cut
124 Condensing optical system
126 Laser light
126a Separate laser beam
126b Separate laser beam
127 Dividing optical system
128 Lens
129 Concave roof mirror
130 Convex roof mirror
131 Optical fiber 124 Condensing optical system
126 Laser light
126a Separate laser beam
126b Separate laser beam
127 Dividing optical system
128 Lens
129 Concave roof mirror
129a Mirror
129b Mirror
130 Convex roof mirror
130a Mirror
130b Mirror
131 Optical fiber 122 Object to be cut
122a Cutting site
126a Separate laser beam
132 Outer assist gas nozzle
132a Tip opening
133 Assist gas supply pipe
134 Inner assist gas nozzle
134a Tip opening
$Q_{1T}$ Assist gas
$Q_{2T}$ Assist gas
f Focal position Example of heavy plate cutting with YAG laser 121 Laser beam machining head
122 Object to be cut
122a Cutting site
123 Lens-barrel
124 Condensing optical system
125 Protective glass
126 Laser light 126a Separate laser beam
126b Separate laser beam
128 Lens
132 Outer assist gas nozzle
132a Tip opening
133 Assist gas supply pipe
134 Inner assist gas nozzle
134a Tip opening
$Q_{1T}$ Assist gas
$Q_{2T}$ Assist gas
f Focal position (a)

132 Outer assist gas nozzle
132a Tip opening
134 Inner assist gas nozzle
134a Tip opening
F Direction of cutting (b)

122 Object to be cut
122a Cutting site
135 Section of assist gas flow jetted from inner assist gas nozzle
F Direction of cutting 121 Laser beam machining head
122 Object to be cut
122a Cutting site
123 Lens-barrel
124 Condensing optical system
125 Protective glass
126 Laser light
126a Separate laser beam
126b Separate laser beam
128 Lens
132 Outer assist gas nozzle
132a Tip opening
133 Assist gas supply pipe
134 Inner assist gas nozzle
134a Tip opening
$Q_{1T}$ Assist gas
$Q_{2T}$ Assist gas
G Direction of cutting 121 Laser beam machining head
122 Object to be cut
122a Cutting site
123 Lens-barrel
124 Condensing optical system
125 Protective glass
126 Laser light
126a Separate laser beam
126b Separate laser beam
128 Lens
132 Outer assist gas nozzle
132a Tip opening
133 Assist gas supply pipe
134 Inner assist gas nozzle
134a Tip opening
136 Hole
137 Drive device
$Q_{1T}$ Assist gas
$Q_{2T}$ Assist gas
G Direction of cutting 121 Laser beam machining head
122 Object to be cut
122a Cutting site
123 Lens-barrel
124 Condensing optical system
125 Protective glass
126 Laser light
126a Separate laser beam
126b Separate laser beam
128 Lens
132 Outer assist gas nozzle
132a Tip opening
133 Assist gas supply pipe
134 Inner assist gas nozzle
134a Tip opening
138 Hole
139 Drive device
140 Drive device
$Q_{1T}$ Assist gas
$Q_{2T}$ Assist gas
f Focal position 121 Laser beam machining head
122 Object to be cut
122a Cutting site
123 Lens-barrel
124 Condensing optical system
125 Protective glass
126 Laser light
126a Separate laser beam
126b Separate laser beam
128 Lens
132 Outer assist gas nozzle
132a Tip opening
133 Assist gas supply pipe
134 Inner assist gas nozzle
134a Tip opening
138 Hole
139 Drive device
140 Drive device
$Q_{1T}$ Assist gas
$Q_{2T}$ Assist gas
f Focal position 206 Laser beam
206a Condensing site
210 Electrode
213 Arc
216 Base material
223 Composite welding head
224 Laser welding head
225 TIG welding head 201 Optical fiber
204 Imaging lens system
206 Laser beam
207 Filler wire
208 Filler wire feed pipe
209 Filler wire feeder
214 Total reflection mirror
216 Base material
226 Filler wire-coaxial laser welding head 201 Optical fiber
204 Imaging lens system
206 Laser beam
210 Electrode
211 Electrode holding pipe
212 Welding power source
214 Total reflection mirror
216 Base material
227 TIG arc-coaxial laser welding head 301 Laser beam machining head
302 Object to be cut
302a Cutting site
303 Laser light
304 Condensing optical system
305 Lens-barrel
306 Assist gas nozzle
306a Tip opening
307 Protective glass
308 Assist gas supply pipe
310 Lens
$Q_T$ Assist gas 302 Object to be cut
302a Cutting site
303 Laser light
306 Assist gas nozzle
306a Tip opening
306b Inner surface 302 Object to be cut
302a Cutting site
G Direction of cutting

LASER BEAM MACHINING HEAD

This application is a div of appln. Ser. No. 09/429,079 filed Oct. 29, 1999 now U.S. Pat. No. 6,294,754.

BACKGROUND OF THE INVENTION

1. Field of the Invention

The present invention relates to a laser beam machining head. More specifically, the invention relates to a laser beam machining head for feeding a filler wire, or having an electrode for various types of arc welding, such as inert gas shielded tungsten (TIG) arc welding, metal active gas (MAG) arc welding, and plasma arc welding, the head being useful as a tip machining optical system for laser beam machining.

The present invention is also useful when applied to a laser beam machining head of a laser beam machine for cutting or piercing a workpiece of a metal or the like.

2. Description of the Related Art

FIG. 21 is an explanation drawing conceptually showing a composite welding head according to an earlier technology. As shown in the drawing, a composite welding head 223 performs laser welding and TIG welding, and has two welding heads, i.e., a laser welding head 224 and a TIG welding head 225. With such a composite welding head 223, the same site of welding is machined with laser light and a TIG arc, so that it is impossible to set both welding heads 224 and 225 vertically relative to a base material 216. Thus, either the welding head 224 or the welding head 225 is inclined forward or rearward, namely, is given an angle of advance or an angle of backing to carry out welding. In FIG. 21, a tungsten electrode 210 at the tip of the TIG welding head 225 is inclined forward so that an arc 213 will reach a condensing site 206a for a laser beam 206.

FIG. 22 is an explanation drawing conceptually showing a filler wire-coaxial laser welding head 226 according to an earlier technology. As shown in the drawing, the filler wire-coaxial laser welding head 226 has a structure in which a filler wire 207 is passed through holes perforated at the center of a total reflection mirror 214 and an imaging lens system 204. The filler wire 207 and an optical axis of a laser beam are rendered coaxial, and the filler wire-coaxial laser welding head 226 is designed to perform welding while feeding the filler wire 207 via a filler wire feed pipe 208. With the filler wire-coaxial laser welding head 226, a laser beam 206 launched from an optical fiber 201 is reflected by the total reflection mirror 214, and condensed by the imaging lens system 204 for use in fusing a base material 216 and the filler wire 207. The filler wire 207 is fed by a filler wire feeder 209.

FIG. 23 is an explanation drawing conceptually showing a TIG arc-coaxial laser welding head 227 according to an earlier technology. As shown in the drawing, this TIG arc-coaxial laser welding head 227 arranges an electrode 210 for TIG welding and a laser beam optical axis coaxially, thereby performing TIG welding and laser welding simultaneously. Its constitution is basically the same as the constitution of the filler wire-coaxial laser welding head 226 shown in FIG. 22, the difference existing only in the electrode 210, an electrode holding pipe 211 for holding the electrode 210, and a welding power source 212.

FIG. 24 is a vertical sectional view showing the constitution of a tip portion of a conventional, typical laser beam machining head. A laser beam machining head 301 shown in the drawing is provided in a laser beam machine (its machine body is not shown) which cuts an object 302 to be cut, such as carbon steel.

As shown in FIG. 24, a lens-barrel 305 houses a condensing optical system (an imaging lens system) 304 composed of a plurality of lenses 310, and a protective glass 307 for protecting the condensing optical system 304. The condensing optical system 304 condenses laser light 303, and projects it onto a cutting site 302a of the object 302 to be cut. On this occasion, a focal position, f, of the laser light 303 condensed by the condensing optical system 304 is usually adjusted to lie within the object 302 to be cut, as illustrated in the drawing. The laser light 303 is generated by a laser oscillator such as a YAG laser oscillator (not shown), and then transmitted to the condensing optical system 304 by an optical transmission means such as an optical fiber or mirrors (not shown).

On a laser light ejection side of the condensing optical system 304 (i.e., a lower end portion of the lens-barrel 305), an assist gas nozzle 306 is attached in such a manner as to surround the laser light 303 that has been ejected from the condensing optical system 304. The assist gas nozzle 306 is shaped like a truncated cone with a tip side (lower end side) becoming thin, and has an opening 306a at the tip side. To a side surface of the assist gas nozzle 306, an assist gas supply pipe 308 is connected. The assist gas supply pipe 308 is tied to an assist gas supply device (not shown) That is, an assist gas $Q_T$ transported from the assist gas supply device is introduced into the assist gas nozzle 306 via the assist gas supply pipe 308, and is jetted through the tip opening 306a of the assist gas nozzle 306 toward the cutting site 302a of the object 302 to be cut.

A cutting operation for the object 302 to be cut, by means of the laser beam machine equipped with the laser beam machining head 301 of the above-described constitution, is performed in the following manner: First, the laser beam machining head 301 is brought close to the object 302 to be cut, by the use of a laser beam machining head moving device (not shown). Also, the distance between the tip of the assist gas nozzle 306 and the surface of the object 302 to be cut (i.e., work distance), h, is kept so that there will be no contact between the assist gas nozzle 306 and the object 302 to be cut. In this condition, either the laser beam machining head 301 is moved by the laser beam machining head moving device in a direction perpendicular to the sheet face of FIG. 24, or the object 302 to be cut is moved by a work moving device (not shown) in a direction opposite to the moving direction of the laser beam machining head.

In accordance with this movement, the laser beam machining head 301 condenses the laser light 303 by the condensing optical system 304, and projects it onto the cutting site 302a of the object 302 to be cut, thereby fusing the cutting site 302a. Simultaneously, an assist gas is jetted toward the cutting site 302a from the tip opening 306a of the assist gas nozzle 306, and introduced into the cutting site 302a, to blow away and remove fused metal within the cutting site 302a. Thus, the object 302 to be cut is laser cut.

SUMMARY OF THE INVENTION

Of the earlier technologies described above, the composite welding head 223 shown in FIG. 21 has two welding heads, i.e., the laser welding head 224 and the TIG welding head 225. This composite welding head 223 is large in size, and its direction of welding cannot be selected freely, because the two constituent welding heads are at fixed positions, i.e., front and rear positions. Thus, this type of welding head is not suitable for welding an object of a three dimensional shape. With the filler wire-coaxial laser welding head 226 shown in FIG. 22, the center of the laser beam 206 launched from the optical fiber 201 is the site of the strongest intensity distribution of light. This site is the very place where the filler wire feed pipe 208 is situated. The laser beam 206 projected onto the filler wire feed pipe 208 is irregularly reflected, causing a beam transmission loss. Such a laser beam may not be used effectively depending on a purpose to be attained. The TIG arc-coaxial laser welding head 227 shown in FIG. 23, like the filler wire-coaxial laser welding head 226 shown in FIG. 22, poses the problem that the laser beam 206 is irregularly reflected by the electrode holding pipe 211, causing a beam output loss.

The present invention has been accomplished in view of the above-described problems with the earlier technologies. It is an object of the invention to provide a laser beam machining head which can satisfactorily perform welding of an object of a complicated shape, such as a three-dimensional shape, and can also achieve efficient welding without causing a loss in a laser beam projected.

The laser beam machining head of the present invention that attains the above object is characterized by the following:

1) A convex roof mirror and a concave roof mirror are combined to divide a laser beam in two, thereby forming two separate laser beams to be condensed.

2) In the laser beam machining head which is a filler wire- or a TIG, MAG or plasma arc-coaxial laser welding head comprising a filler wire or an electrode for various arcs such as TIG, MAG and plasma arcs, and an optical axis of a laser beam, the filler wire or the electrode and the optical axis being coaxially arranged, a convex roof mirror and a concave roof mirror are combined to divide the laser beam in two, thereby forming two separate laser beams to be condensed so that no laser beam is projected onto a filler wire feed pipe or an electrode holding pipe.

3) In the laser beam machining head which is a filler wire-coaxial laser welding head comprising a filler wire, and an optical axis of a laser beam, a convex roof mirror and a concave roof mirror are combined to divide the laser beam in two, thereby forming two separate laser beams to be condensed, with spacing being present between the two separate laser beams, and the filler wire is fed to a condensing position via a filler wire guide in the spacing between the two separate laser beams from a filler wire feed pipe disposed outside the laser beams.

4) In the laser beam machining head which is a TIG, MAG or plasma arc-coaxial laser welding head comprising an electrode for various arcs such as TIG, MAG and plasma arcs and an optical axis of a laser beam, a convex roof mirror and a concave roof mirror are combined to divide the laser beam in two, thereby forming two separate laser beams to be condensed, with spacing being present between the two separate laser beams, and a tip of the electrode is held above a condensing position while the electrode is supported by a water flow pipe or an electrode holding pipe passing through the spacing between the laser beams.

5) In the laser beam machining head recited in 1), 2), 3) or 4) above, the ratio of the intensities of the two separate laser beams, or the position of the laser beam may be changed by making the position of an optical fiber for laser beam transmission, or the convex roof mirror and the concave roof mirror, movable relative to a lens center in two directions perpendicular to the optical axis in a plane perpendicular to the optical axis.

In laser cutting using an assist gas as shown in FIG. 24, the manner of flowing the assist gas to the cutting site 302a, i.e., the flow velocity and flow rate of the assist gas jetted at the cutting site 302a, greatly affect cutting performance.

With the conventional laser beam machining head 301, as shown in FIG. 25, the diameter of the opening (the width of the opening), d, of the assist gas nozzle 306 is considerably greater than the cutting width (kerf width), w, (in laser cutting, the cutting width w is as small as, say, 2 to 3 mm). Thus, the entire assist gas $Q_T$ jetted from the assist gas nozzle 306 is divided into an assist gas $Q_2$ which is fed into the cutting site 302a, and assist gases $Q_3$, $Q_4$ which flow to both sides of the cutting site 302a through the clearance between the assist gas nozzle 306 and the object 302 to be cut. That is, only a part of the assist gas $Q_T$ introduced into the assist gas nozzle 306 (i.e., assist gas $Q_2$) flows into the cutting site 302a, resulting in a small flow rate of assist gas which contributes to cutting. Hence, the efficiency of removal of fused metal by the assist gas is so low that the cutting performance is low. Furthermore, the gas pressure cannot be increased, because of restrictions imposed by the pressure-resistant strength of the optical parts.

As shown in FIG. 26, the tip opening 306a of the assist gas nozzle 306 may be thinned, in comparison with the earlier technologies, to make the opening diameter d and the cutting width W nearly equal. By so doing, most of the assist gas introduced into the assist gas nozzle 306 flows into the cutting site 302a, and the velocity of the assist gas jetted becomes greater than before. In addition, as is known in hydrodynamics, a zone with a length L (>4d) in a tip portion of the assist gas nozzle 306 may be set at a constant internal diameter, d. This stabilizes the flow of the assist gas, increasing its directivity.

In this case, however, part of the laser light 303 interferes with an inner surface 306b of the assist gas nozzle 306 (i.e., a shaded portion in FIG. 26) at the tip portion of the assist gas nozzle 306. As a result, its thermal energy is absorbed, or the partial light is irregularly reflected, causing the directivity of the laser light 303 to be lost. Hence, the laser light 303 is not projected effectively onto the object 302 to be cut, with the result that the cutting performance is decreased. In other words, the opening diameter d of the assist gas nozzle 306 is restricted by the breadth of the laser light 303 at the tip opening 306a, and thus cannot be made smaller than the width over which the laser light 303 broadens.

As indicated by a pattern of a cut surface shown in FIG. 27, when the object 302 to be cut is cut in a direction of an arrow G, for example, the pattern at the cutting site 302a points obliquely in a direction opposite to the direction of cutting. Thus, a substantial thickness of the plate to be cut increases compared with the actual plate thickness T, resulting in a decrease in the cutting ability.

This tendency appears more clearly as the plate thickness T increases. This is because with increasing plate thickness T, the penetrating ability for the plate thickness T (the ability to fuse the object 302 to be cut, by heat and penetrate through it) lowers; at a deep position in the direction of plate thickness, moreover, the ability of the assist gas to remove fused metal also declines, so that fused metal tends to flow in the direction opposite to cutting without flowing downwards. If the plate thickness T becomes even greater, and this tendency becomes even stronger, the object 302 to be cut cannot be cut any more.

The cutting ability of the laser light 303 for the object 302 to be cut is affected by the position of the focal position f of the laser light 303 relative to the object 302 to be cut. Customary practice has been to adjust the focal position f of the laser light 303 to rest in the interior, in the direction of plate thickness, of the object 302 to be cut, as shown in FIG. 24. If this focal position f can be suitably adjusted depending on the material and thickness of the object 302 to be cut, an increase in the cutting performance can be expected. However, if it is attempted to change the focal position f of the laser light 303 by moving the laser beam machining head 301 in the direction of plate thickness, the assist gas nozzle 306 also moves in the direction of plate thickness to change the distance between the assist gas nozzle 306 and the object 302 to be cut. Consequently, there may be a decrease in the ability of the assist gas to remove fused metal.

From the point of view of the ability of the assist gas to remove fused metal, the assist gas nozzle 306 should be made as close as possible to the object 302 to be cut. If the laser beam machining head 301 is moved upward in FIG. 24 to move upward the focal position f of the laser light 303 relative to the object 302 to be cut, the assist gas nozzle 306 also moves upward accordingly, increasing the spacing h between the assist gas nozzle 306 and the object 302 to be cut. Thus, the ability of the assist gas to remove fused metal lowers. If the assist gas nozzle 306 is brought close to the object 302 to be cut, by contrast, the focal position f of the laser light 303 relative to the object 302 to be cut is moved, and the assist gas nozzle 306 interferes with the object 302 to be cut.

In the light of these problems, it is another object of the present invention to provide a laser beam machining head which can increase the ability of an assist gas to remove fused matter, such as fused metal, by efficiently feeding the assist gas into a machining site (a cutting site or a piercing site) of a workpiece to be cut or pierced, and also increasing a jet velocity of the assist gas.

It is still another object of the invention to provide a laser beam machining head which can efficiently feed the assist gas into the machining site, increase a jet velocity of the assist gas, and increase a jet flow rate of the assist gas.

It is a further object of the invention to provide a laser beam machining head which can remove the fused matter more efficiently (can make the substantial thickness of a plate to be cut, close to the actual plate thickness) from a cutting site of an object to be cut, by jetting an assist gas at the cutting site obliquely relative to the direction of cutting.

It is a still further object of the invention to provide a laser beam machining head which can make the substantial thickness of a plate to be cut, close to the actual plate thickness by adjusting the direction of a jet of an assist gas toward the cutting site of the object to be cut, to be an optimal direction.

It is an additional object of the invention to provide a laser beam machining head which can increase the machining ability of laser light by adjusting the position of the assist gas nozzle relative to the workpiece, or the focal position of the laser light relative to the workpiece, independently to be an optimal position.

It is an even additional object of the invention to provide a laser beam machining head which can protect a condensing optical system reliably.

Therefore, the laser beam machining head of the present invention that solves the aforementioned problems is characterized by the following:

6) A laser beam machining head of a laser beam machine for projecting laser light onto a workpiece, and also blowing an assist gas at the workpiece to cut or pierce the workpiece, comprising:

a dividing optical system for dividing the laser light into at least two separate laser beams, and providing spacing between the separate laser beams;

a condensing optical system for condensing the separate laser beams into condensed laser light, and projecting the condensed laser light onto a cutting site or a piercing site of the workpiece; and an inner assist gas nozzle placed between the separate laser beams, a width of an opening of a tip portion of the inner assist gas nozzle being nearly equal to a cutting width of the cutting site, or a hole diameter of the piercing site.

7) A laser beam machining head of a laser beam machine for projecting laser light onto a workpiece, and also blowing an assist gas at the workpiece to cut the workpiece, comprising:

a dividing optical system for dividing the laser light into at least two separate laser beams, and providing spacing between the separate laser beams;

a condensing optical system for condensing the separate laser beams into condensed laser light, and projecting the condensed laser light onto a cutting site of the workpiece; and an inner assist gas nozzle placed between the separate laser beams, a width of an opening of a tip portion of the inner assist gas nozzle being nearly equal to a cutting width of the cutting site, and a length of the opening of the tip portion being larger than the width of the opening.

8) A laser beam machining head of a laser beam machine for projecting laser light onto a workpiece, and also blowing an assist gas at the workpiece to cut the workpiece, comprising:

a dividing optical system for dividing the laser light into at least two separate laser beams, and providing spacing between the separate laser beams;

a condensing optical system for condensing the separate laser beams into condensed laser light, and projecting the condensed laser light onto a cutting site of the workpiece; and an inner assist gas nozzle placed between the separate laser beams, a width of an opening of a tip portion of the inner assist gas nozzle being nearly equal to a cutting width of the cutting site, and a tip side of the inner assist gas nozzle being inclined in a direction of cutting.

9) The laser beam machining head of 8) above, wherein an angle of inclination of the inner assist gas nozzle can be varied independently of a direction of projection of the laser light.

10) A laser beam machining head of a laser beam machine for projecting laser light onto a workpiece, and also blowing an assist gas at the workpiece to cut or pierce the workpiece, comprising:

a dividing optical system for dividing the laser light into at least two separate laser beams, and providing spacing between the separate laser beams;

a condensing optical system for condensing the separate laser beams into condensed laser light, and projecting the condensed laser light onto a cutting site or a piercing site of the workpiece; and an inner assist gas nozzle placed between the separate laser beams, a width of an opening of a tip portion of the inner assist gas nozzle being nearly equal to a cutting width of the cutting site, or a hole diameter of the piercing site, and wherein:

relative positions of the inner assist gas nozzle and the workpiece can be varied independently of relative positions of a focal position of the condensing optical system and the workpiece; or the relative positions of the focal position of the condensing optical system and the workpiece can be varied independently of the relative positions of the inner assist gas nozzle and the workpiece.

11) In the laser beam machining head described in 6), 7), 8), 9) or 10), an outer assist gas nozzle may be provided at an exit side of the condensing optical system so as to surround the separate laser beams launched from the condensing optical system, and the assist gas may also be jetted through a tip opening of the outer assist gas nozzle.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 21:
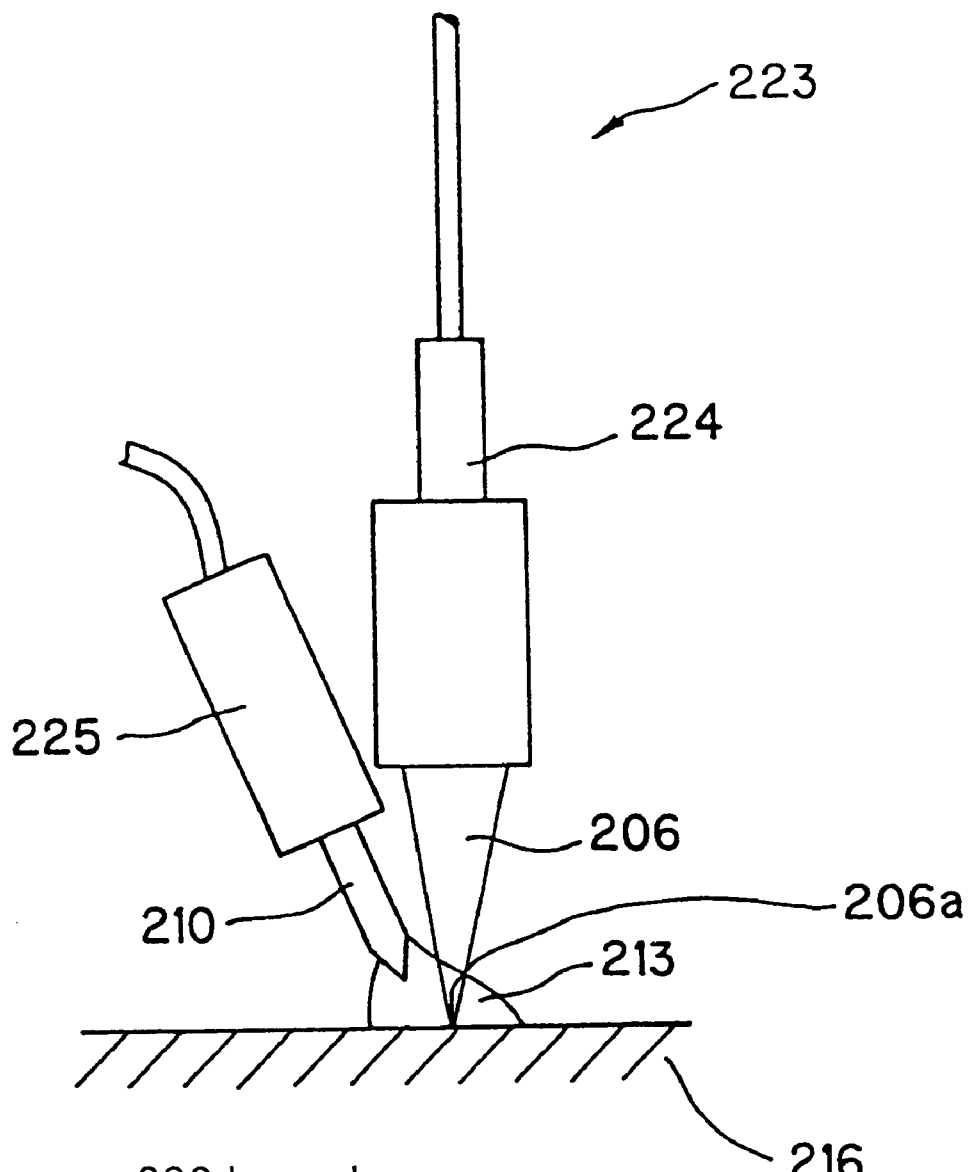
FIG. 21 is an explanation drawing conceptually showing a composite welding head according to an earlier technology.
Figure 22:
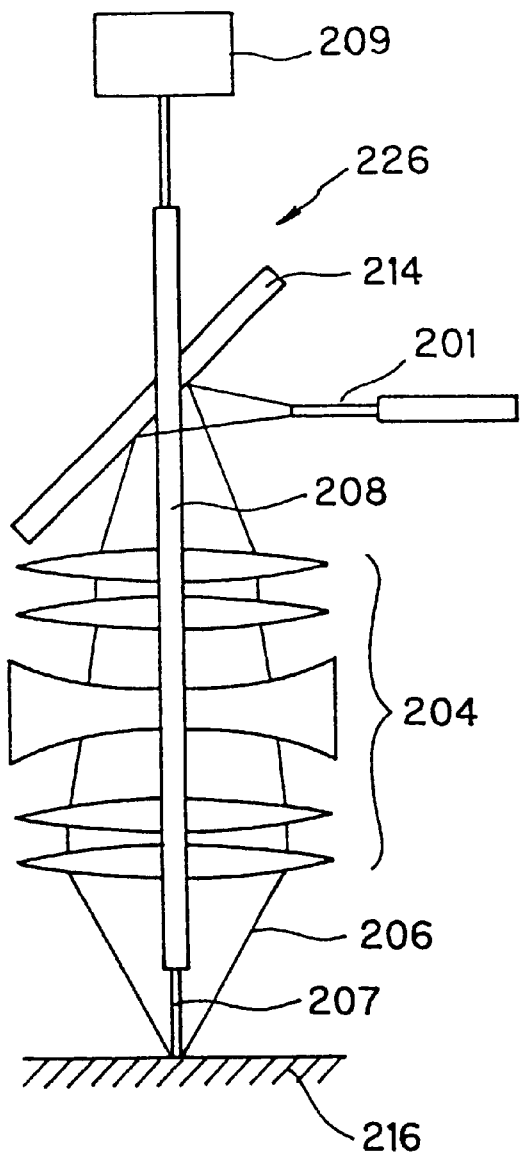
FIG. 22 is an explanation drawing conceptually showing a filler wire-coaxial laser welding head according to an earlier technology.
Figure 23:
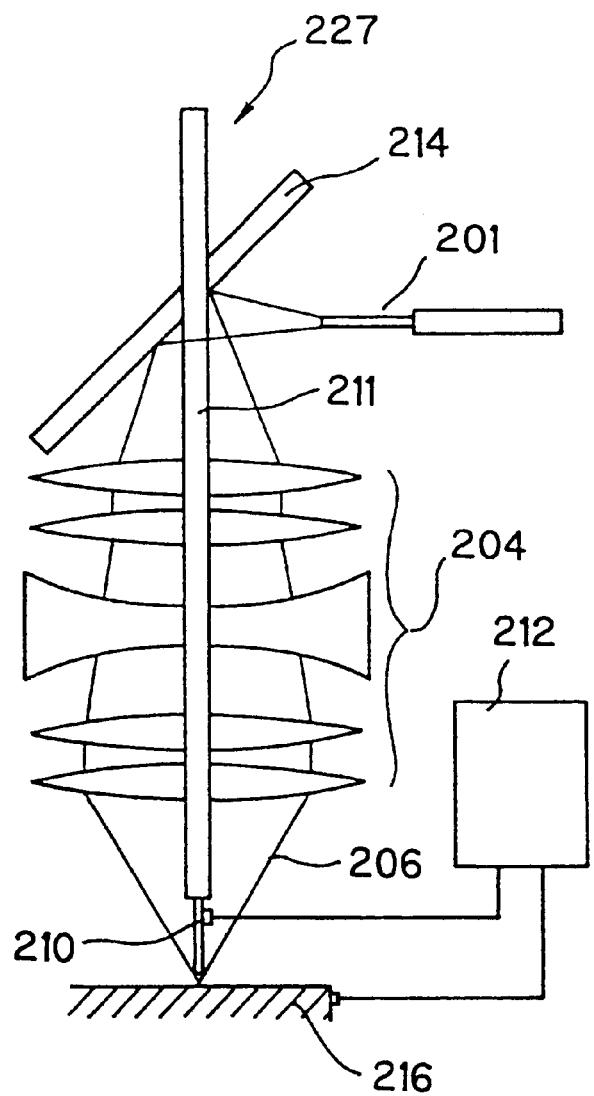
FIG. 23 is an explanation drawing conceptually showing a TIG arc-coaxial laser welding head according to an earlier technology.

Embodiments of the present invention will be described in detail with reference to the accompanying drawings. In FIGS. 1 to 3 and FIGS. 6 to 8, the same parts as used in the earlier technologies shown in FIGS. 21 to 23 will be assigned the same numerals, and overlapping explanations will be omitted.

[First and Second Embodiments]

Figure 1:
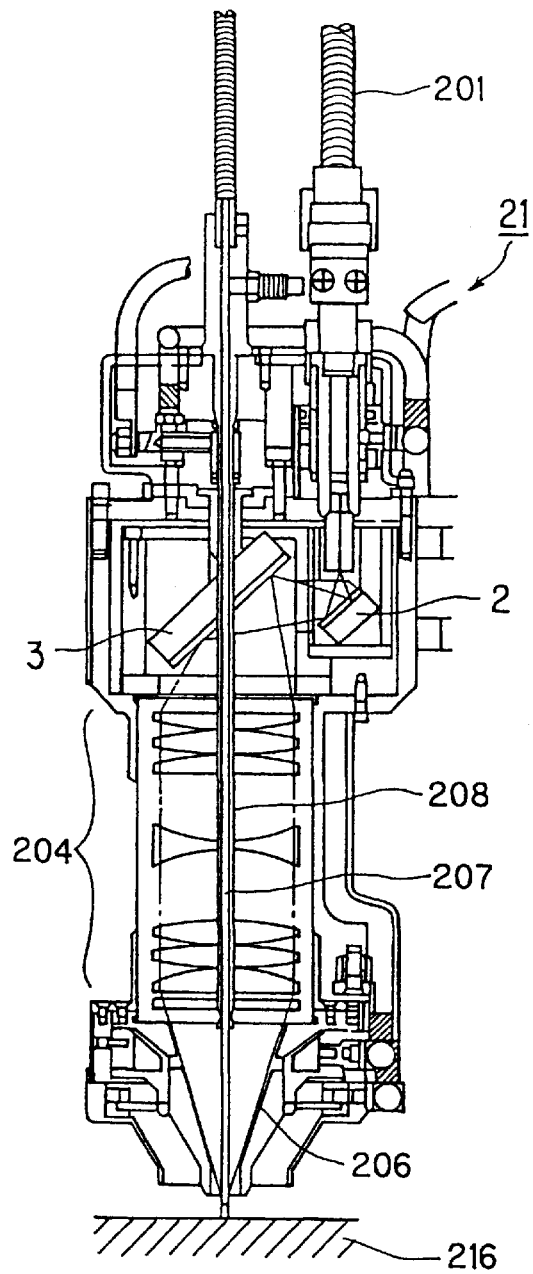
FIG. 1 is a sectional view showing a filler wire-coaxial laser welding head according to a first embodiment of the present invention.

FIG. 1 is a sectional view showing a filler wire-coaxial laser welding head according to a first embodiment of the present invention. As shown in this drawing, a filler wire-coaxial laser welding head 21 has a convex roof mirror 2 and a pierced concave roof mirror 3. A laser beam 206 launched from an optical fiber 201 is reflected by the convex roof mirror 2, whereby it is divided into two separate beams. The two separate laser beams 206 are reflected by the pierced concave roof mirror 3, and guided to an imaging lens system 204. The pierced concave roof mirror 3 is a mirror having a hole formed at its center for passage of a filler wire feed pipe 208. In this case, because of the division of the laser beam 206 into two separate beams, each laser beam 206 has its center out of contact with the filler wire feed pipe 208, as will be described later on in FIG. 3, and passes through the imaging lens system 204. Then, the separate laser beams 206 converge at an imaging plane on the surface of a base material 216, realizing keyhole welding in which a filler wire 207 and the base material 216 have been fused.

Figure 2:
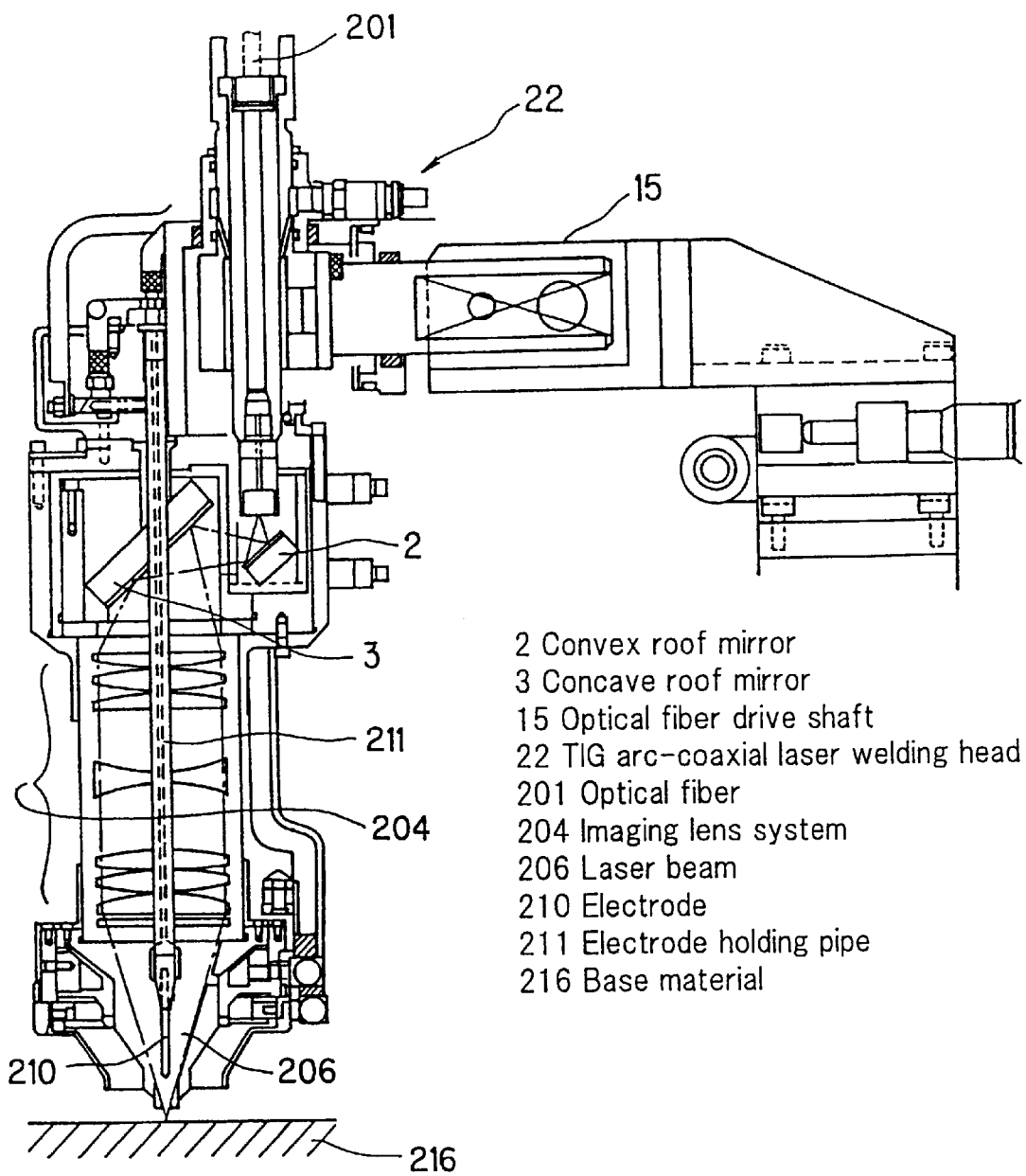
FIG. 2 is a sectional view showing a TIG arc-coaxial laser welding head according to a second embodiment of the present invention.

FIG. 2 is a sectional view showing a TIG arc-coaxial laser welding head according to a second embodiment of the present invention. As shown in this drawing, a TIG arc-coaxial laser welding head 22 also has a convex roof mirror 2 and a pierced concave roof mirror 3. A laser beam 206 launched from an optical fiber 201 is reflected by the convex roof mirror 2, whereby it is divided into two separate beams. The resulting two separate laser beams 206 are reflected by the pierced concave roof mirror 3, which has a hole formed for passage of an electrode holding pipe 211, and are then guided to an imaging lens system 204. In this case, too, each separate laser beam 206 has its center out of contact with the electrode holding pipe 211, and passes through the imaging lens system 204. Then, the separate laser beams 206 converge at an imaging plane on the surface of a base material 216. The so converged laser beam 206 and arc heat generated by an electrode 210 for TIG welding fuse the base material 216 to realize keyhole welding. At this time, the position of the optical fiber 201 can be changed freely on a plane normal to the optical axis of the laser beam 206 by an optical fiber drive shaft 15.

Figure 3:
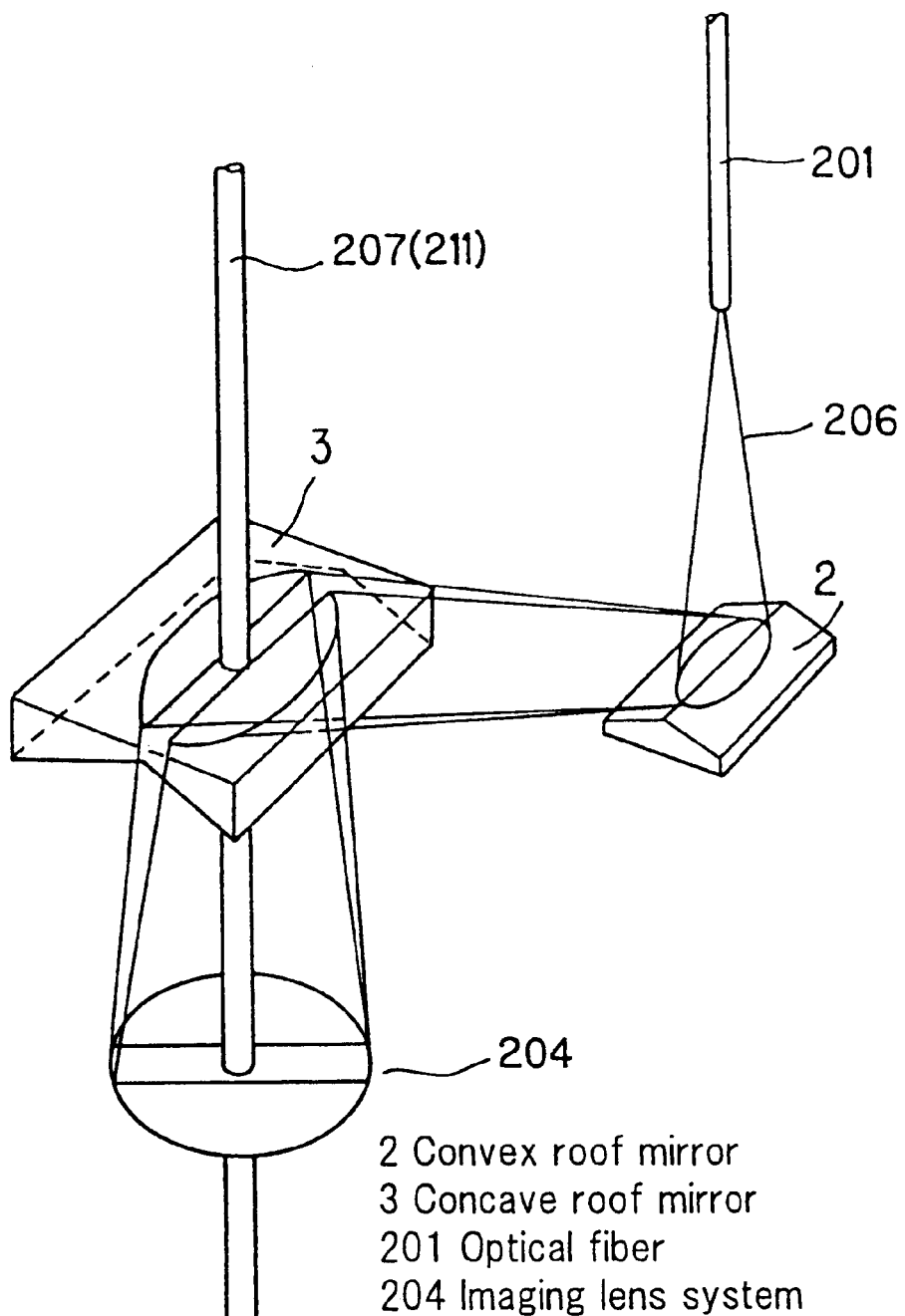
FIG. 3 is an explanation drawing for illustrating actions by a combination of convex and concave roof mirrors in the first and second embodiments.

FIG. 3 is an explanation view for illustrating the division of the laser beam 206 into two separate beams by a combination of convex and concave roof mirrors in the first and second embodiments. As shown in the drawing, the laser beam 206 launched from the optical fiber 201 is divided at its center into two separate beams by the convex roof mirror 2 which is projected at the center in the shape of a mountain, and which is composed of two mirrors. Thus, the laser beam 206 is converted into two semicircular laser beams 206, which are reflected by the convex roof mirror 2. In detail, the laser beam 206 launched from the optical fiber 201 is circular in shape, while the laser beam 206 divided by the convex roof mirror 2 is formed into two semicircular laser beams 206 and reflected toward the concave roof mirror 3. Then, these separate laser beams 206 are reflected by the concave roof mirror 3, which is depressed at the center in the shape of a valley and which is composed of two mirrors, and are then incident on the imaging lens system 204 composed of a plurality of pierced lenses. As a result of reflection by the convex roof mirror 2, the circular laser beam 206 turns into semicircular beams. The distance between these semicircular beams can be changed according to the placement of the mirrors 2, 3 which are optical systems, and the angles of the vertices of the mountain and the valley of the convex roof mirror 2 and the concave roof mirror 3, respectively. Between these semicircular beams, the filler wire feed pipe 208 or the electrode holding pipe 211 is situated. Thus, the filler wire feed pipe 208 or the electrode holding pipe 211 is not irradiated with the laser beam 6.

Figure 4:
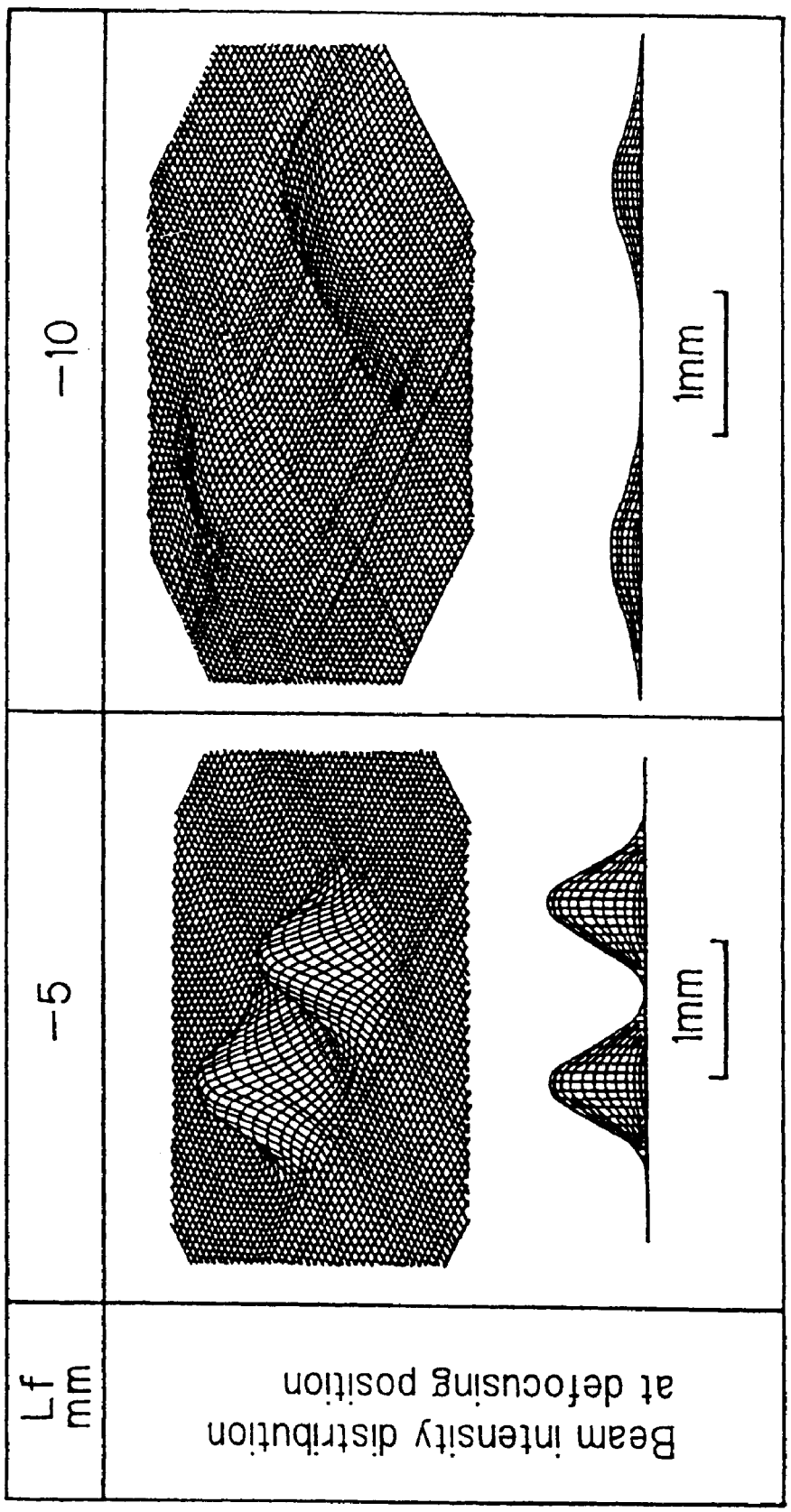
FIG. 4 is an explanation drawing showing beam intensity distributions at positions deviated toward lenses from an image formation surface during a condensing process in the first and second embodiments.

FIG. 4 is an explanation drawing showing beam intensity distributions of the laser beam 206 at positions 5 mm and 10 mm deviated toward lenses from the imaging surface during the condensing process in the laser beam machining head involving the combination of the concave and convex roof mirrors in the first and second embodiments. As shown in the drawing, the laser beam 206 is divided into two separate beams as far as a site near the imaging surface because of the combination of the convex roof mirror 2 and the concave roof mirror 3. Hence, a high intensity distribution of the laser beam 206 is not located at the position of the filler wire supply pipe 208 or the electrode holding pipe 211 laid at the center.

Figure 5:
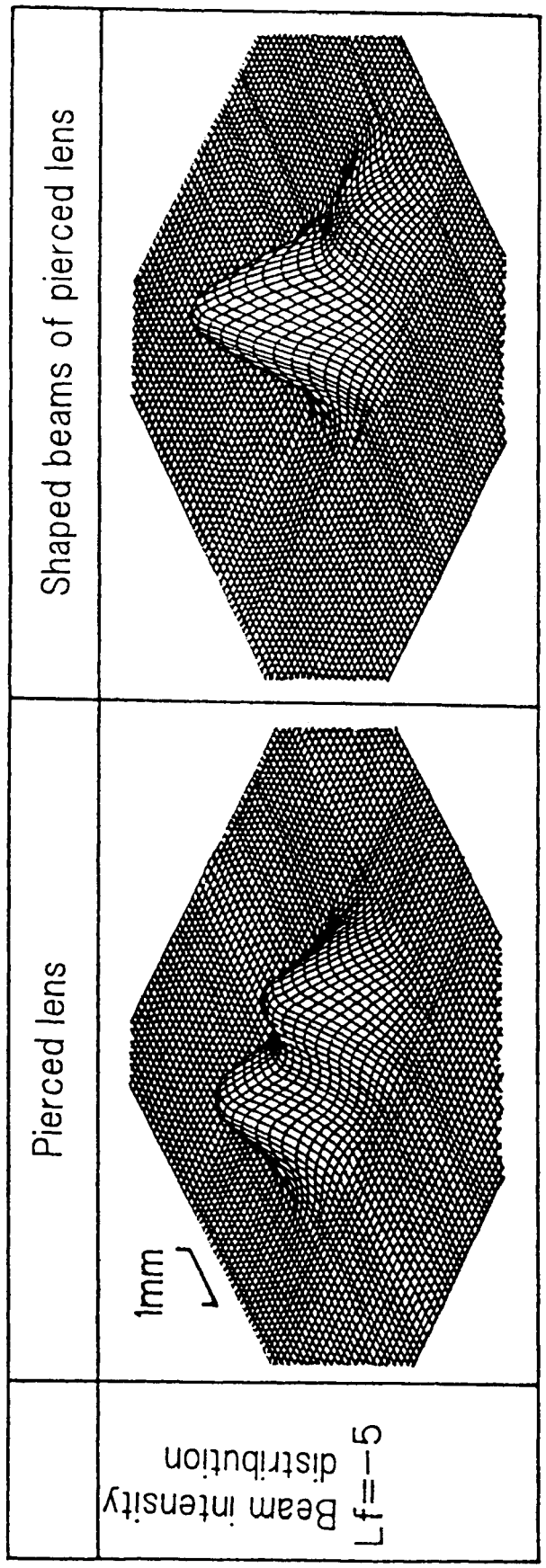
FIG. 5 is an explanation drawing showing a shaped beam intensity distribution of a pierced lens in the first and second embodiments.

Furthermore, the laser beams 206 condensed are somewhat defocused, whereby twin beams with varied intensities can be created as shown in FIG. 5. The beam intensities of the two beams 206 condensed at the condensing site can be varied relatively freely by adjusting the position of the optical fiber 201 with the use of the optical fiber drive shaft 15 (see FIG. 2; the same constitution is provided, although not shown, in FIG. 1), or by making the convex roof mirror 2 and the concave roof mirror 3 movable perpendicularly in two directions on a plane normal to the optical axis.

The structures shown in FIGS. 1 to 3 are designed to divide the laser beam 206 into two semicircular beams by the use of the convex roof mirror 2 and the concave roof mirror 3, thereby suppressing or preventing the irradiation of the filler wire feed pipe 208 or the electrode holding pipe 211 with the laser beam.

[Third Embodiment]

However, the structure of an optical system having a hole formed at the center of the convex roof mirror 3 and also a hole formed at the center of the imaging lens system 204 is expensive because of man-hours in production, and so forth. Besides, the optical system is liable to be damaged by the filler wire feed pipe 208 or the electrode holding pipe 211. It is recommendable to use the concave roof mirror 3 and the imaging lens system 204 that are ordinary (holeless).

Under these circumstances, the inventors made the improvement of performing satisfactory welding of an object of a complicated shape, such as a three-dimensional shape, by using an ordinary concave roof mirror 3 and an ordinary imaging lens system 204, and arranging the optical axis of a laser beam and the filler wire 207 or electrode 210 in a coaxial fashion. The inventors also added the improvement of performing efficient welding free from irradiation of the filler wire feed pipe or the electrode holding pipe with a laser beam.

Figure 6A:
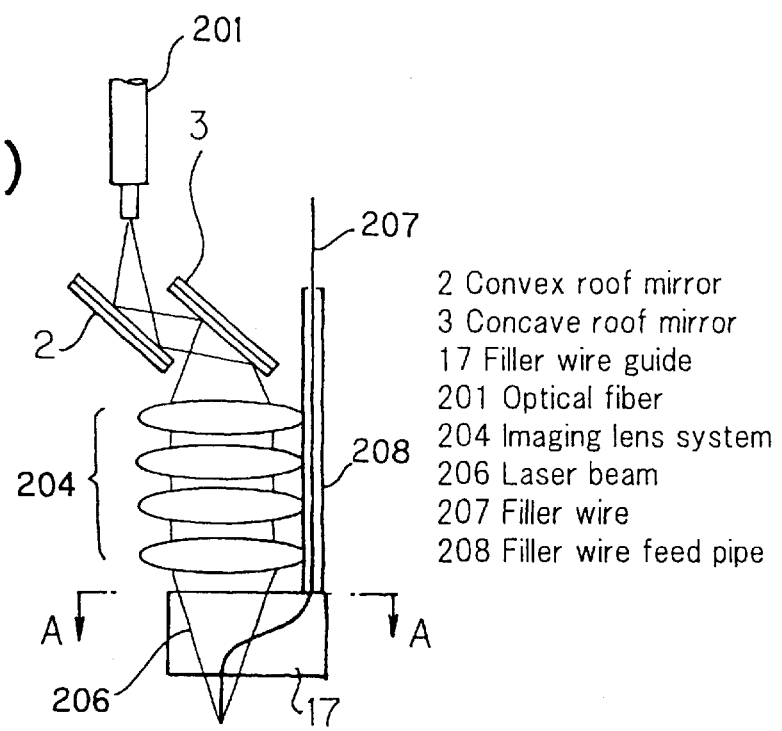
FIGS. 6(a) to 6(c) are schematic constitution drawings illustrating a third embodiment of the present invention.

FIG. 6(a) is a schematic view showing a head in which a filler wire 207 and an optical axis of a laser beam 206 are arranged coaxially at a beam condensing position by the use of a concave roof mirror 3 and an imaging lens system 204 which are ordinary (hole-free).

That is, a laser beam launched from an optical fiber 201 is divided into two semicircular laser beams 206 by a convex roof mirror 2 and the concave roof mirror 3, and these semicircular laser beams are spaced from each other by a certain distance. These separate laser beams 206 from the concave roof mirror 3 are condensed via the imaging lens system 204. In this case, the concave roof mirror 3 and the imaging lens system 204 are ordinary, hole-free optical parts.

A filler wire feed pipe 208 is placed adjacent to and along the imaging lens system 204. The filler wire 207 is fed within the filler wire feed pipe 208 so as to become parallel to the optical axis of the laser beam 206.

Figure 6B:
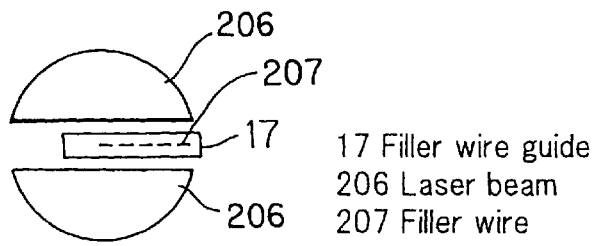
Figure 6C:
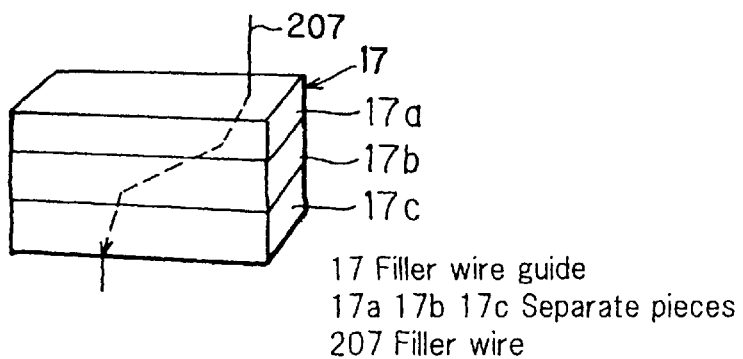
Figure 7A:
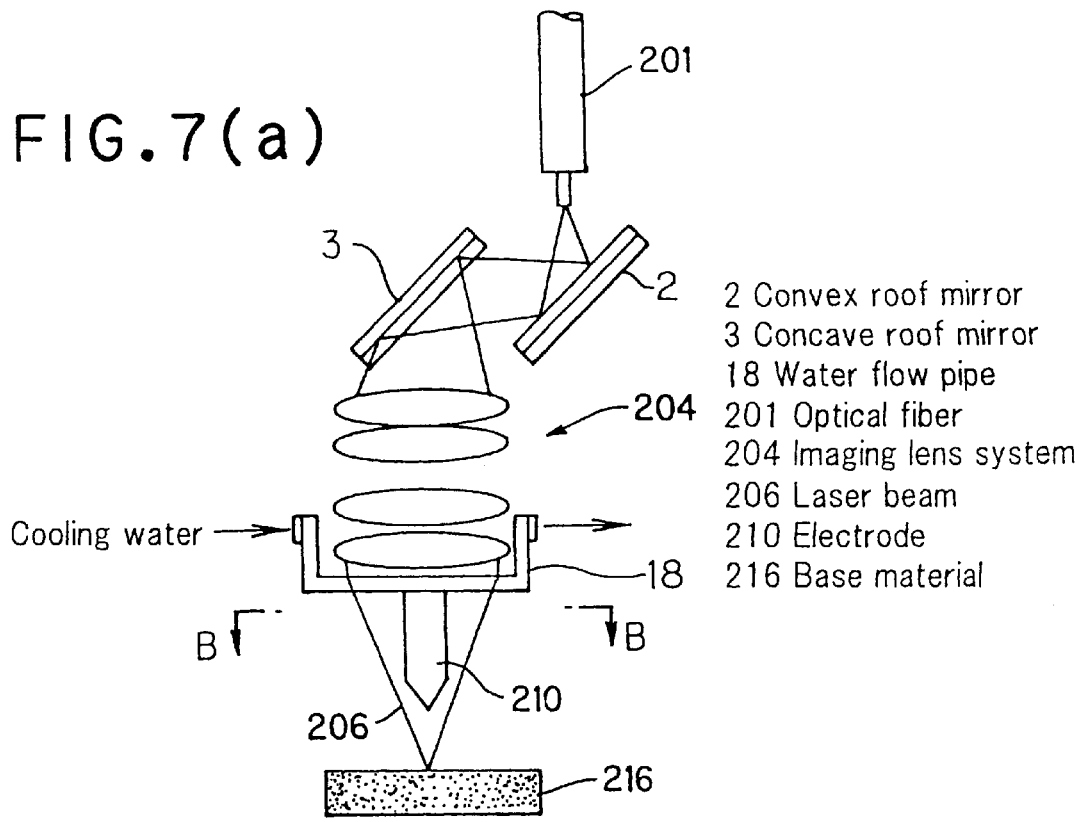
FIGS. 7(a) and 7(b) are schematic constitution drawings illustrating a fourth embodiment of the present invention.
Figure 7B:
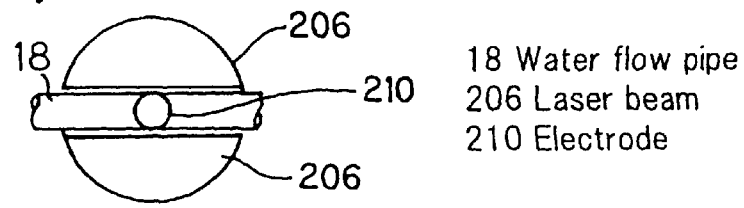

At the lower end of the filler wire feed pipe 208, a filler wire guide 17 is provided. The filler wire guide 17 is located below the imaging lens system 204 for guiding the filler wire 207 coaxially with the optical axis of the laser beam 206. As shown in FIGS. 6(b) and 6(c), the filler wire guide 17 has a slender rectangular shape, and has a hole, formed from an upper portion at one end thereof to a lower portion at the other end thereof, for guiding the filler wire.

The filler wire guide 17 is formed in a slender shape so as to be positioned between the two semicircular laser beams 206 that have left the imaging lens system 204. Thus, the filler wire guide 17 is free from irradiation with the laser beams 206. It should be noted, here, that the separate laser beams 206 are condensed and converged toward a base material into a bundle of beams. Hence, the filler wire guide 17 cannot be placed very close to the condensing position, but is placed above the condensing position. Depending on the status of condensation of the separate laser beams 206, the lower portion of the filler wire guide 17 may be tapered so that the filler wire guide 17 will be wedge-shaped overall. In either case, direct irradiation of the filler wire guide 17 with the laser beams can be avoided.

Moreover, the direction of the filler wire 207 can be changed inside the filler wire guide 17. Thus, in forming a hole for passage of the filler wire 207, it is permissible, as shown in FIG. 6(c), to divide the filler wire guide 17 into a plurality of pieces in a vertical direction, form straight holes in the resulting separate pieces 17a, 17b, 17c, and connect these holes together. This enables the passage hole to be formed easily. In FIG. 6(c), the filler wire guide 17 is divided into the three separate pieces 17a, 17b, 17c. If the filler wire guide 17 is divided into more pieces, however, the filler wire 207 can be guide more smoothly. In addition, the filler wire guide 17 can be divided not only vertically as shown in FIG. 6(c), but also in a horizontal (length) direction.

Besides, the filler wire guide 17, which is produced and placed so as not to be irradiated with the laser beam 206, may be irradiated with reflected light as well as direct light. Thus, it is advisable to apply a gold coat with high reflectivity to the outer surface of the filler wire guide 17.

[Fourth Embodiment]

FIG. 6 has shown an improvement utilizing the filler wire guide 17, while FIG. 7 shows an improvement in an electrode 210 for TIG welding. That is, the head of FIG. 7 has the electrode 210 of tungsten and an optical axis of a laser beam 206 coaxially arranged with the use of a concave roof mirror 3 and an imaging lens system 204 which are ordinary (not holed).

A laser beam launched from an optical fiber 201 is divided into two semicircular, spaced laser beams 206, and condensed onto a base material 216, as in FIG. 6.

Below the imaging lens system 204, the electrode 210 is placed opposite the base material 216, on an optical axis of the original laser beam 206, and between the two separate beams such that the electrode 210 is not directly irradiated with these beams. This electrode 210 is supported by a water flow pipe 18, which is parallel to the lens surface and passes between the two separate laser beams 206, and a voltage is applied to the electrode 210.

A tip of the electrode 210 is tapered according to the degree of condensation of the separate laser beams 206. A front end of the electrode 210 is not brought very close to the base material 216 in order to generate an arc. Thus, the degree of the taper can be determined in consideration of the degree of separation of the electrode 210 from the base material 216.

Figure 8A:
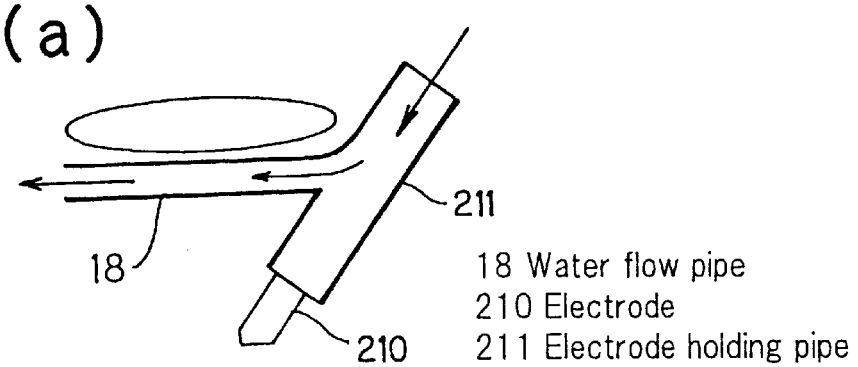
FIGS. 8(a) and 8(b) are constitution drawings showing a modified example of an electrode of the fourth embodiment.

FIG. 8(a) shows a structure in which the electrode 210 is held obliquely from beside the imaging lens system 204. According to this structure, an electrode holding pipe 211 concurrently serves as the water flow pipe 18 until midway, and from there, the water flow pipe 18 is branched to become parallel to the lens surface.

Figure 8B:
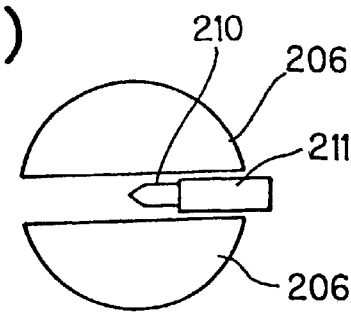

Furthermore, the electrode 210 has its front end positioned on the optical axis of the original laser beam 206. In addition, the electrode 210, as well as the electrode holding pipe 211, is located between the two separate laser beams 206, as shown in FIG. 8(b).

In the embodiments shown in FIGS. 6(a) to 6(c), 7(a) and 7(b), and 8(a) and 8(b), the intensity of the condensed beam can be varied by positional adjustment using the optical fiber drive shaft 15 shown in FIG. 2, or by the movement of the convex roof mirror and the concave roof mirror.

[Fifth Embodiment]

Figure 9:
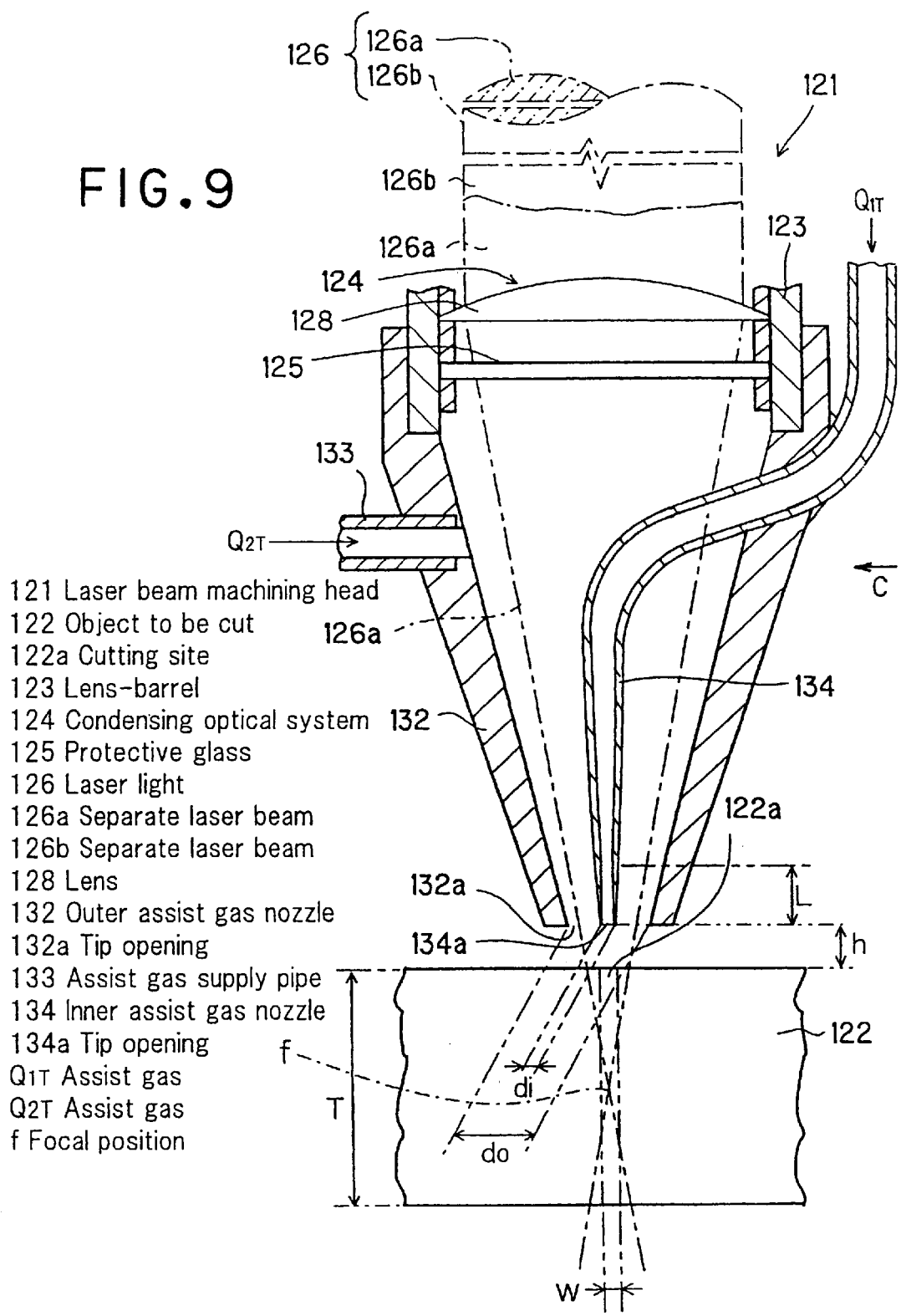
FIG. 9 is a vertical sectional view showing a constitution of a tip portion of a laser beam machining head according to a fifth embodiment of the present invention.
Figure 10A:
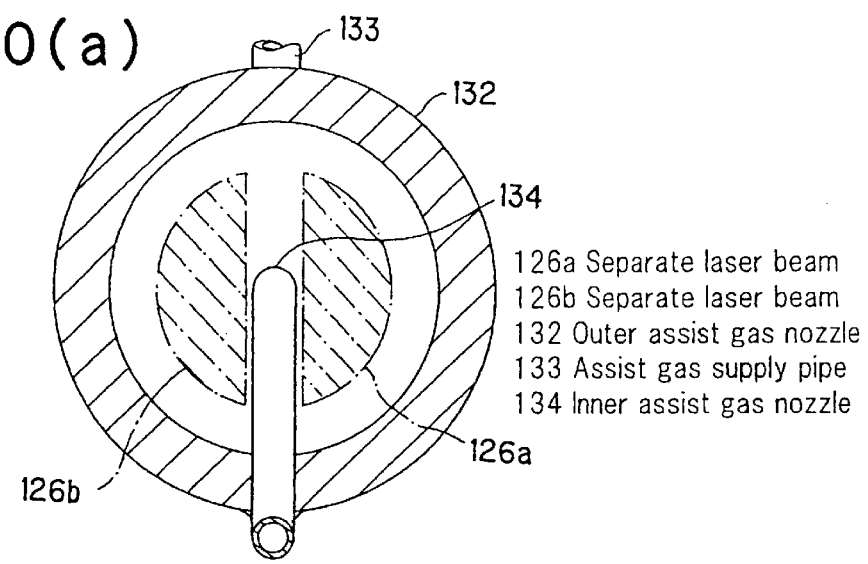
FIG. 10(a) is a cross sectional view showing the constitution of the tip portion of the laser beam machining head (a sectional view taken along line D—D in FIG. 10(b), and FIG. 10(b) is a vertical sectional view taken in a direction of an arrow C in FIG. 9.
Figure 10B:
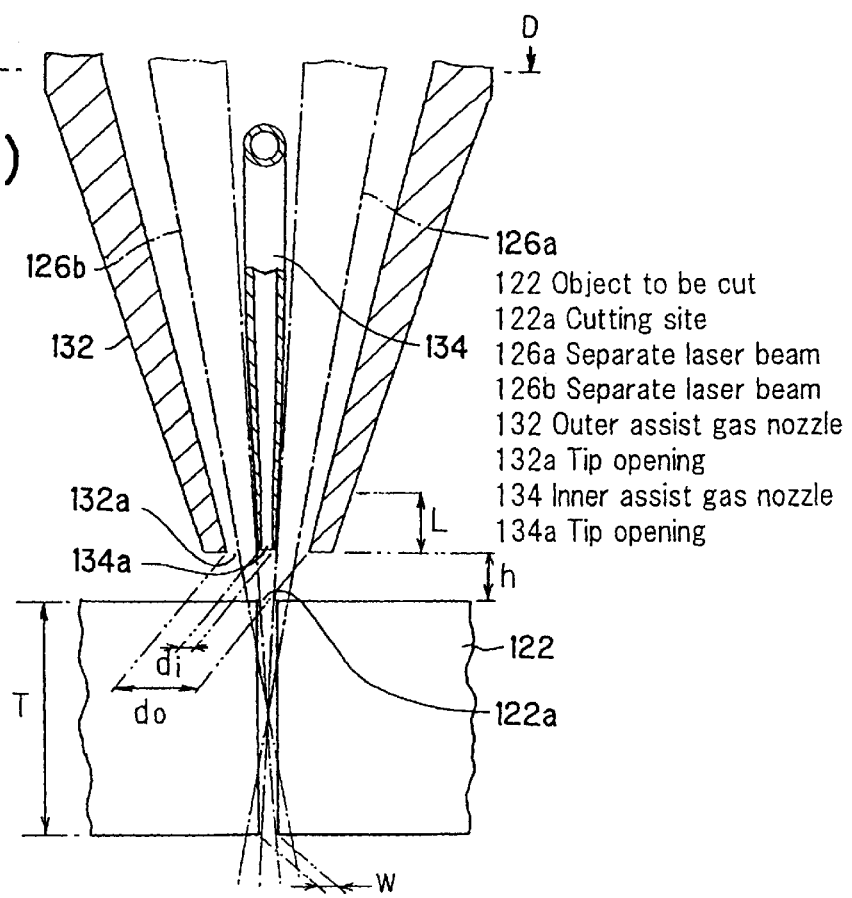
Figure 11:
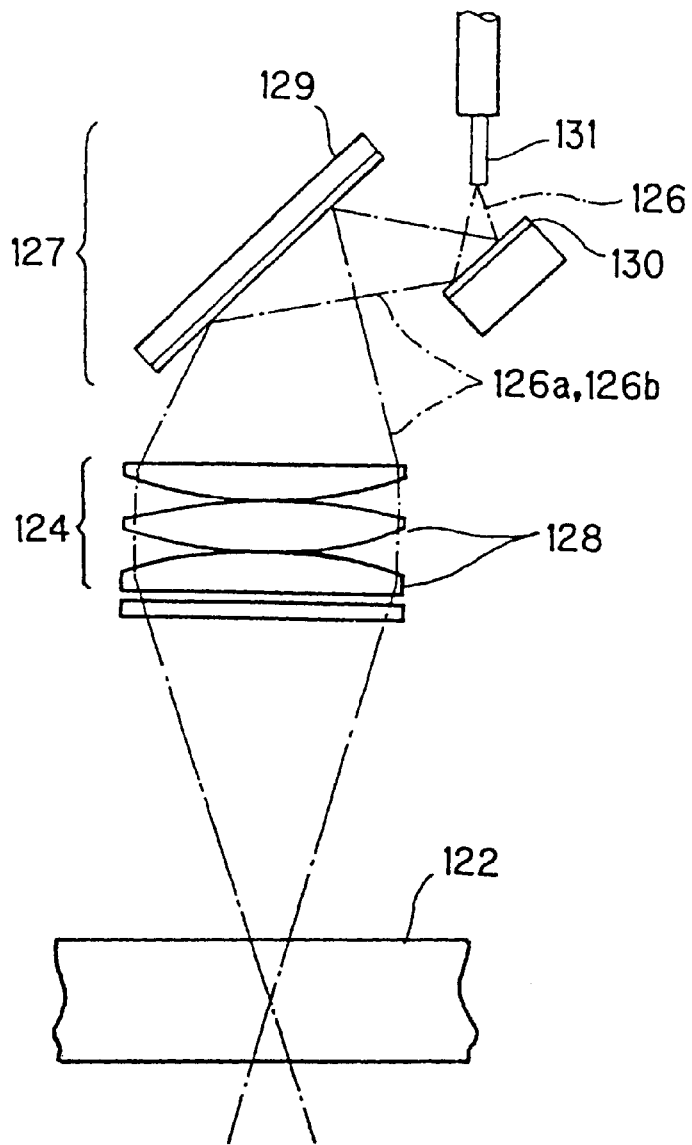
FIG. 11 is a constitution drawing of an optical system provided in the laser beam machining head.
Figure 12:
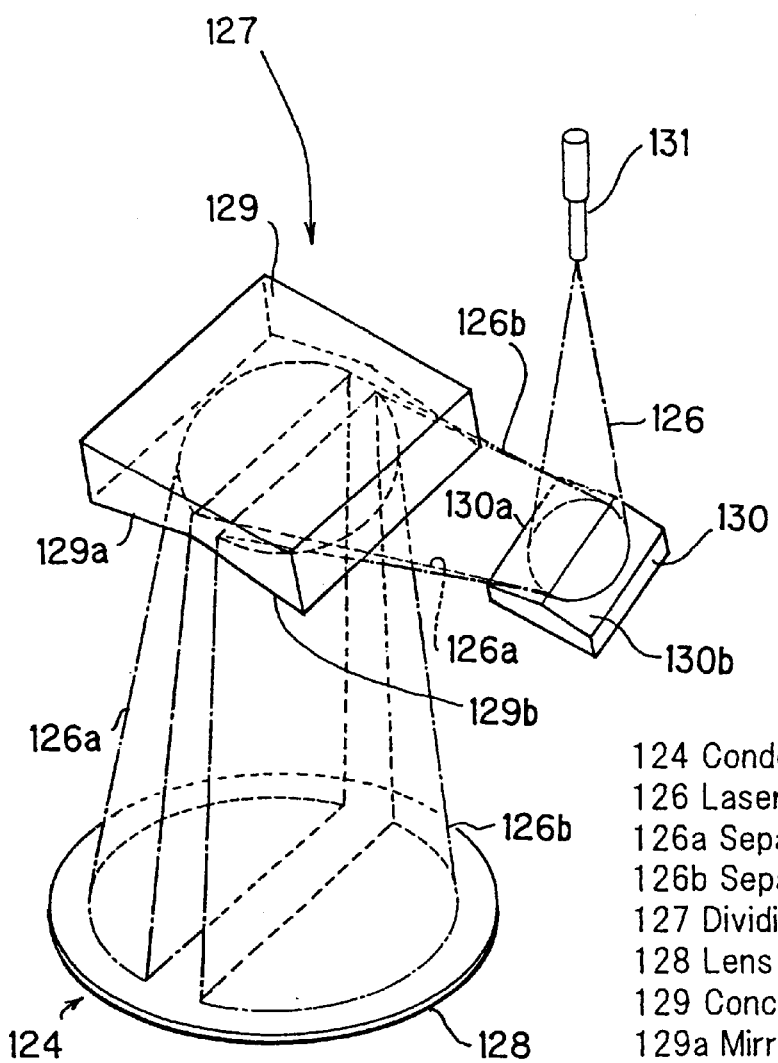
FIG. 12 is a perspective view showing a constitution of a dividing optical system in the above optical system.

FIG. 9 is a vertical sectional view showing a constitution of a tip portion of a laser beam machining head according to a fifth embodiment of the present invention. FIG. 10(a) is a cross sectional view showing the constitution of the tip portion of the laser beam machining head (a sectional view taken along line D—D in FIG. 10(b)). FIG. 10(b) is a vertical sectional view taken in a direction of an arrow C in FIG. 9. FIG. 11 is a constitution drawing of an optical system provided in the laser beam machining head. FIG. 12 is a perspective view showing a constitution of a dividing optical system in the above optical system.

A laser beam machining head 121 shown in FIGS. 9 and 10(a) and 10(b) is provided in a laser beam machine (its machine body is not shown) for cutting an object 122 to be cut, such as carbon steel.

As shown in FIG. 9, a condensing optical system (an imaging lens system) 124, and a protective glass 125 for protecting the condensing optical system 124 are provided in a lens-barrel 123. The condensing optical system 124 condenses two separate laser beams 126a, 126b (to be described later on in detail) created by division, and projects the resulting condensed light onto a cutting site 122a of the object 122 to be cut. A focal position, f, of the laser beams 126a, 126b condensed by the condensing optical system 124 is usually adjusted to lie within the object 122 to be cut, as illustrated.

As shown in FIG. 11, the optical system of the laser beam machining head 121 is composed of the condensing optical system 124 and a dividing optical system 127. The condensing optical system 124 is composed of a plurality of lenses 128 disposed vertically with suitable spacing from each other. The dividing optical system 127 is composed of a concave roof mirror 129 and a convex roof mirror 130 as a pair. The concave roof mirror 129 is disposed obliquely above the condensing optical system 124, while the convex roof mirror 130 is disposed obliquely to be opposed to the concave roof mirror 129.

Above the convex roof mirror 130, a tip portion of an optical fiber 131 is located. Thus, laser light 126 is emitted by a YAG laser oscillator (not shown), then transmitted through the optical fiber 131, and ejected from the tip of the optical fiber 131 toward mirrors 130a, 130b of the convex roof mirror 130.

As shown in FIG. 12, the concave roof mirror 129 is depressed at the center in the shape of a valley, and comprises two mirrors 129a, 129b. Whereas the convex roof mirror 130 projects at the center in the shape of a mountain, and comprises the two mirrors 130a, 130b.

Thus, the laser light 126 launched from the optical fiber 131 is reflected by the convex roof mirror 130 as two semicircular laser beams 126a, 126b divided from the laser light 126 at the center. That is, the laser light 126 from the optical fiber 131 is circular in cross section. Whereas the laser light 126, reflected and divided by the mirrors 130a, 130b of the convex roof mirror 130, becomes the two semicircular separate laser beams 126a, 126b, which are transmitted to the concave roof mirror 129, with these beams being spaced from each other.

Then, the separate laser beams 126a, 126b are reflected by the mirrors 129a, 129b of the concave roof mirror 129, respectively, and transmitted to the condensing optical system 124. In the condensing optical system 124, the laser beams 126a, 126b are condensed and projected onto the cutting site 122a of the object 122 to be cut, as stated earlier (see FIGS. 9, 10(a) and 10(b)). The spacing between the separate laser beams 126a and 126b can be adjusted by changing the arrangement of the convex roof mirror 130 and the concave roof mirror 129, and the angles of the vertices of the mountain and the valley of the convex roof mirror 130 and the concave roof mirror 129.

At an exit side of the condensing optical system 124 (at a lower end portion of the lens-barrel 123), an outer assist gas nozzle 132 is attached so as to surround the separate laser beams 126a, 126b launched from the condensing optical system 124, as shown in FIGS. 9, 10(*a*) and 10(*b*). The outer assist gas nozzle 132 is shaped like a truncated cone with a tip side (lower end side) becoming thin, and has an opening 132a at the tip side.

To a side surface of the outer assist gas nozzle 132, an assist gas supply pipe 133 is connected. The assist gas supply pipe 133 is tied to an assist gas supply device (not shown). Thus, an assist gas $Q_{2T}$ transported from the assist gas supply device is introduced into the outer assist gas nozzle 132 via the assist gas supply pipe 108, and is jetted through the tip opening 132a of the outer assist gas nozzle 132 toward the cutting site 122a of the object 122 to be cut.

The outer assist gas nozzle 132 is provided to protect the condensing optical system 124. In detail, the outer assist gas nozzle 132 itself protects the condensing optical system 124 from a metallic vapor, heat, etc. generated during cutting. Furthermore, jets of an assist gas from the tip opening 132a of the outer assist gas nozzle 132 prevent metallic vapor, etc. from penetrating through the tip opening 132a into the outer assist gas nozzle 132.

To the side surface of the outer assist gas nozzle 132, an inner assist gas nozzle 134 is fixed in such a manner as to pass through this side surface. This inner assist gas nozzle 134 is in the shape of a thin tube, and is placed between the separate laser beams 126a and 126b. Moreover, the inner assist gas nozzle 134 gradually thins toward its tip side (lower end side), and an opening diameter (opening width) $d_i$ of its tip opening 134a is nearly equal to a cutting width (kerf width) w (e.g., 2 to 3 mm) of the cutting site 122a of the object 122 to be cut. Concretely, there are a case in which the opening diameter $d_i$ is equal to the cutting width w, and a case in which the opening diameter $d_i$ is slightly smaller than the cutting width w (the illustrated case). Even if the opening diameter $d_i$ is somewhat larger than the cutting width w, this is more effective than the earlier technologies.

That is, since the laser light 126 is divided by the dividing optical system 127 into the two separate laser beams 126a and 126b, the inner assist gas nozzle 134 can be placed between the separate laser beams 126a and 126b. The so placed inner assist gas nozzle 134 can be formed into a desired thinness without interference with the separate laser beams 126a and 126b.

The inner assist gas nozzle 134 is tied to the assist gas supply device (not shown) via the assist gas supply pipe (not shown). That is, an assist gas $Q_{1T}$ transported from the assist gas supply device is introduced into the inner assist gas nozzle 134 via the assist gas supply pipe, and is jetted through the tip opening 134a of the inner assist gas nozzle 134 toward the cutting site 122a of the object 122 to be cut. Most of the assist gas $Q_{1T}$ is fed into the cutting site 122a.

A zone with a length L (>4$d_i$) in the tip portion of the inner assist gas nozzle 134 is set at a constant internal diameter $d_i$. This stabilizes the flow of the assist gas jetted from the inner assist gas nozzle 134, thereby increasing its directivity.

A cutting operation for the object 122 to be cut, by means of the laser beam machine equipped with the laser beam machining head 121 of the present fifth embodiment, is performed in the following manner: First, the laser beam machining head 121 is brought close to the object 122 to be cut, by the use of a laser beam machining head moving device (not shown). Also, the distance between the tips of the inner assist gas nozzle 134 and the outer assist gas nozzle 132 and the surface of the object 122 to be cut (i.e., work distance), h, is kept at, say, 3 to 4 mm so that there will be no contact of the inner assist gas nozzle 134 and the outer assist gas nozzle 132 with the object 122 to be cut. In this condition, either the laser beam machining head 121 is moved by the laser beam machining head moving device in a direction perpendicular to the sheet face of FIG. 9, or the object 122 to be cut is moved by a work moving device (not shown) in a direction opposite to the moving direction of the laser beam machining head.

In accordance with this movement, the laser beam machining head 121 divides the laser light 126 into two beams by the dividing optical system 127, condenses these separate laser beams 126a, 126b by the condensing optical system 124, and projects the condensed light onto the cutting site 122a of the object 122 to be cut, thereby fusing the cutting site 122a. Simultaneously, an assist gas is jetted from the tip opening 132a of the outer assist gas nozzle 132 to prevent penetration of metallic vapor, etc. into the outer assist gas nozzle 132 and protect the condensing optical system 124.

Furthermore, an assist gas is jetted from the tip opening 134a of the inner assist gas nozzle 134, and introduced into the cutting site 122a, to blow away fused metal within the cutting site 122a and remove it therefrom. Thus, the object 122 to be cut is laser cut.

Figure 13:
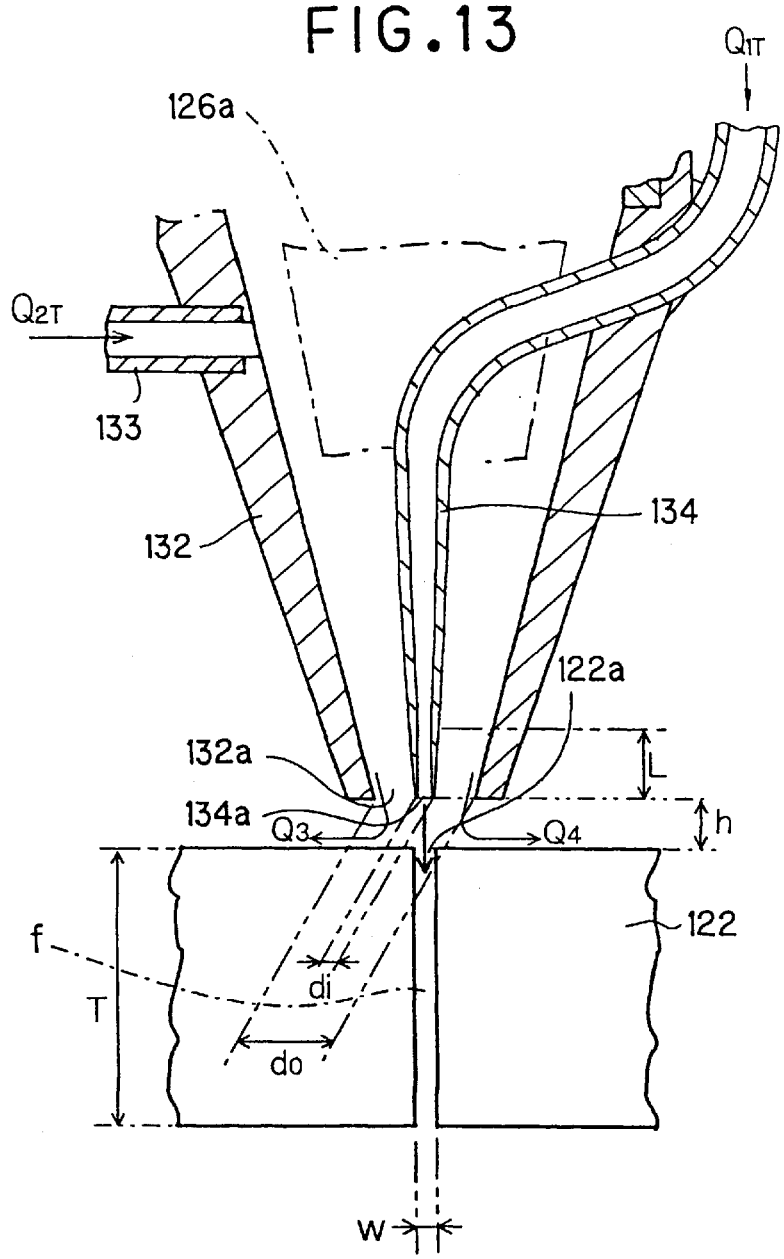
FIG. 13 is an explanation drawing showing a flow of an assist gas.

During this laser cutting, as shown in FIG. 13, the assist gas jetted from the outer assist gas nozzle 132 flows out to both sides of the cutting site 122a from the gap between the outer assist gas nozzle 132 and the object 122 to be cut (assist gases $Q_3$, $Q_4$). Whereas the assist gas jetted from the inner assist gas nozzle 134 is mostly fed into the cutting site 122a, because the opening diameter $d_i$ of the inner assist gas nozzle 134 is nearly equal to the cutting width w.

That is, the assist gas can be fed with high efficiency into the cutting site 122a. Thus, even if the amount of assist gas fed from the assist gas supply device is not increased, the amount of the assist gas: fed into the cutting site 122a can be increased markedly in comparison with the earlier technologies. Moreover, the opening diameter $d_i$ of the inner assist gas nozzle 134 is so small that the jet velocity of the assist gas jetted from the inner assist gas nozzle 134 becomes much higher than in the earlier technologies. The gas pressure can also be raised, without restrictions imposed by the pressure resistant strength of the optical parts. Because of these advantages, the kinetic energy of the assist gas fed into the cutting site 122a becomes great. Thus, the ability of the assist gas to remove fused metal increases remarkably, and the cutting ability is enhanced markedly.

Figure 14:
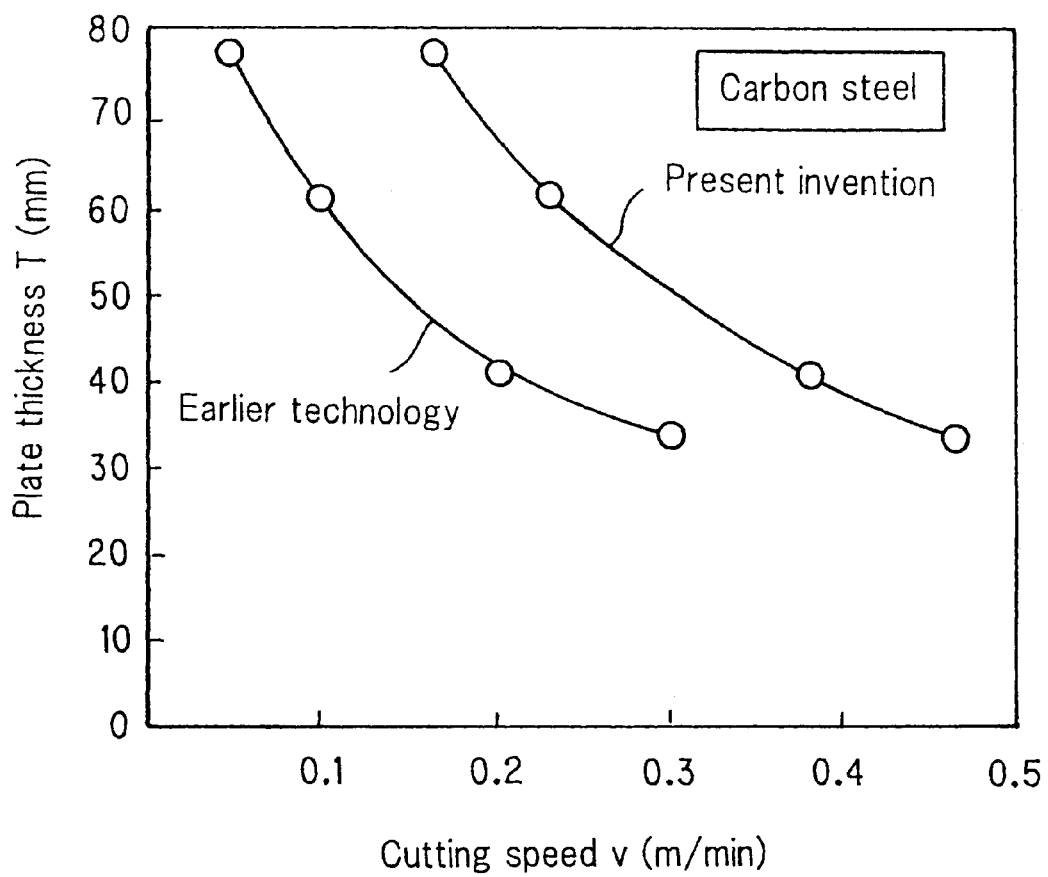
FIG. 14 is a graph showing a comparison of cutting speeds.
Figure 24:
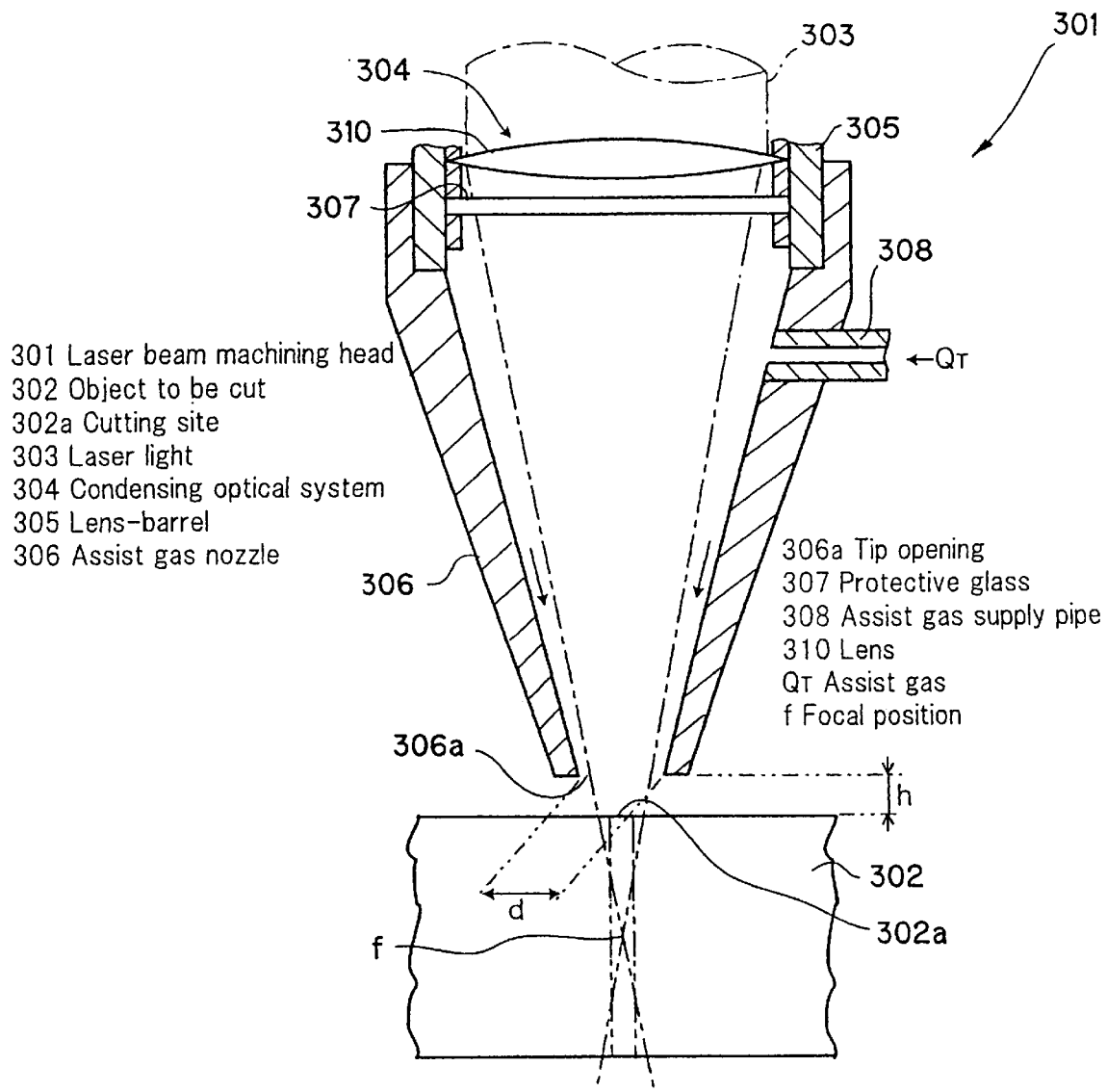
FIG. 24 is a vertical sectional view showing a constitution of a tip portion of a conventional, typical laser beam machining head.
Figure 25:
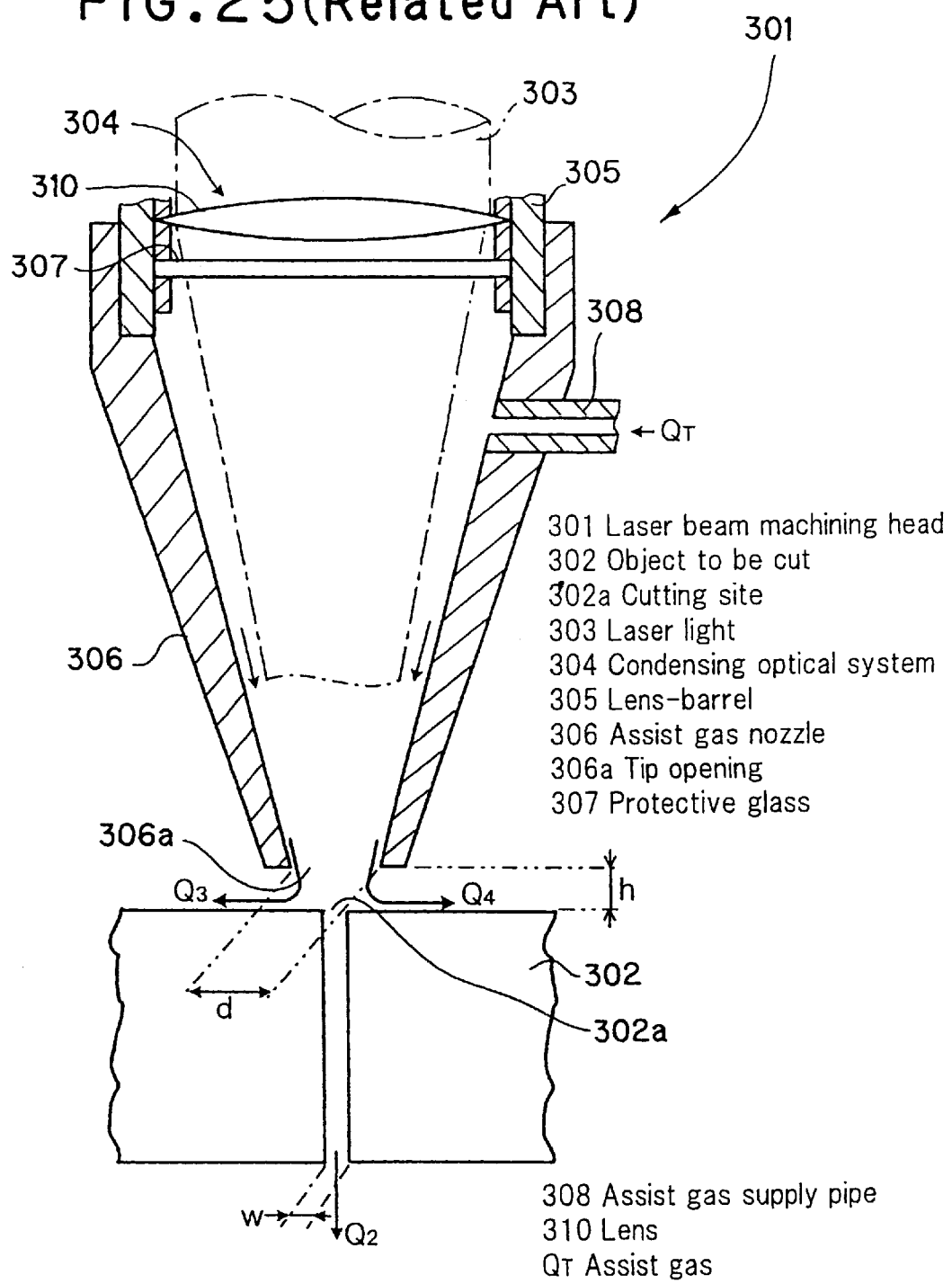
FIG. 25 is an explanation drawing showing a flow of an assist gas.
Figure 26:
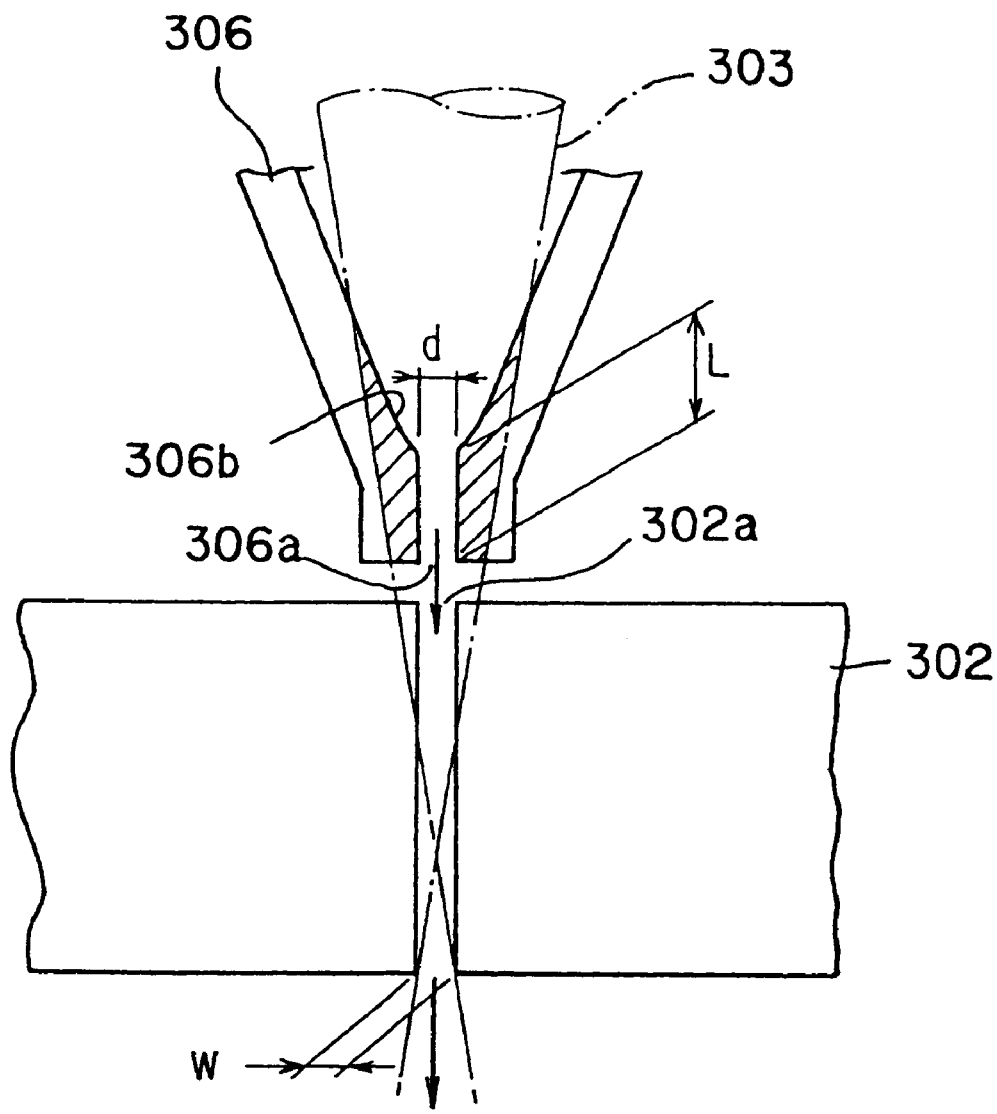
FIG. 26 is an explanation drawing of a thinned assist gas nozzle.

FIG. 14 shows a comparison between the cutting speed obtained by the use of the conventional laser beam machining head 301 (see FIG. 24) and the cutting speed obtained by the use of the laser beam machining head 121 according to the present fifth embodiment. As shown in this drawing, when carbon steels with various plate thicknesses are cut, the cutting speed for the laser beam machining head 121 of the present fifth embodiment is much higher than the cutting speed for the conventional laser beam machining head 301.

Besides, the outer assist gas nozzle 132 is provided on the laser light exit side of the condensing optical system 124, and the assist gas is also jetted from this outer assist gas nozzle 132. Thus, protection of the condensing optical system 124 can be ensured.

[Sixth Embodiment]

Figure 15:
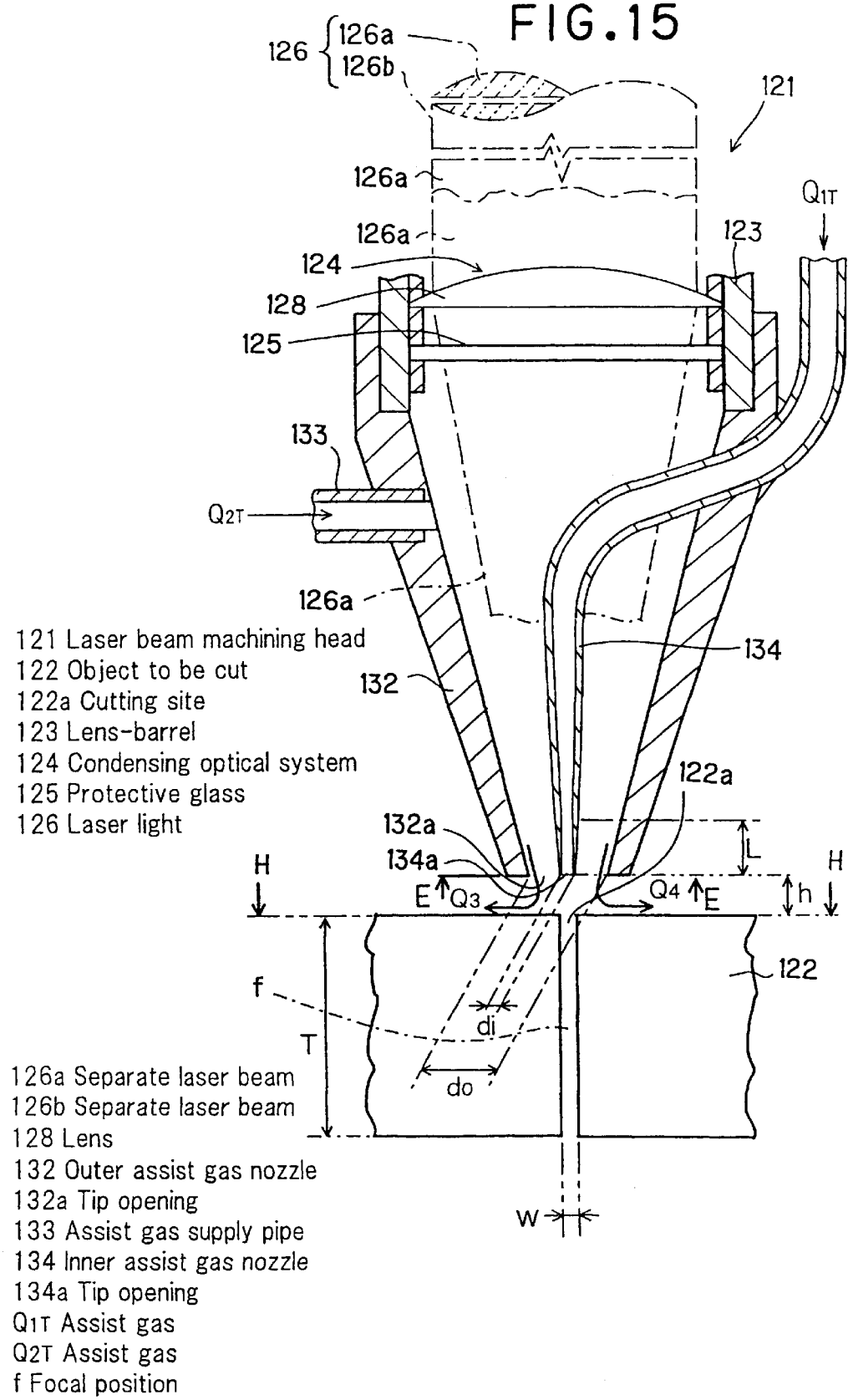
FIG. 15 is a vertical sectional view showing a constitution of a tip portion of a laser beam machining head according to a sixth embodiment of the present invention.

FIG. 15 is a vertical sectional view showing a constitution of a tip portion of a laser beam machining head according to a sixth embodiment of the present invention. FIG. 16(*a*) is an enlarged view taken on line E—E in FIG. 15, and FIG. 16(*b*) is a view taken on line H—H in FIG. 15 on which a section of an assist gas flow jetted through an inner assist gas nozzle has been superimposed.

As shown in FIG. 15, a laser beam machining head 121 according to the present sixth embodiment is the same as the laser beam machining head 121 of the fifth embodiment (see FIG. 9), except the constitution concerning an inner assist gas nozzle 134 to be described later on. Thus, a detailed description of this same constitution is omitted here.

Figure 16A:
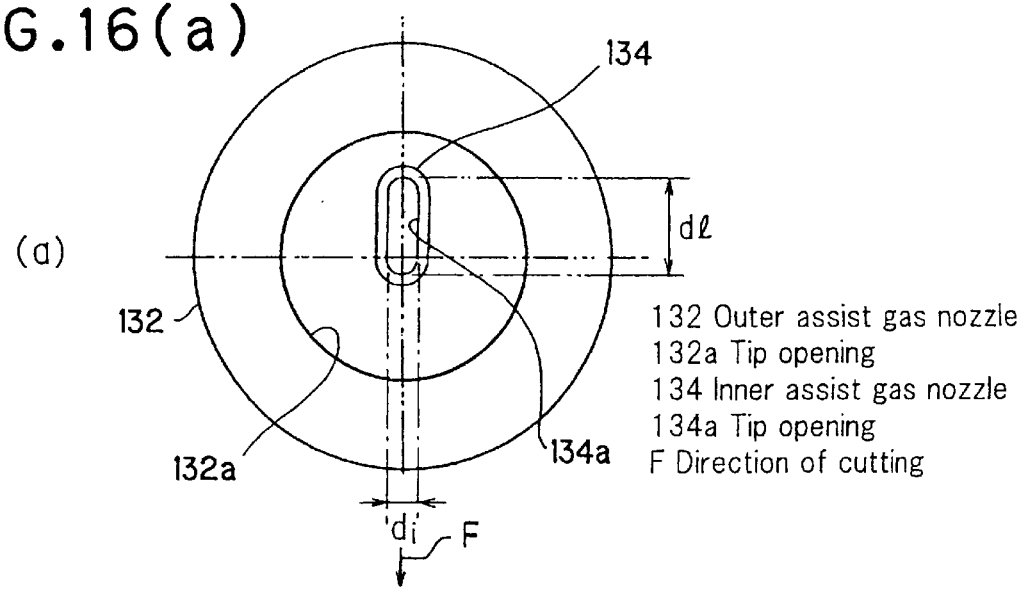
FIG. 16(a) is an enlarged view taken on line E—E in FIG. 15.
Figure 16B:
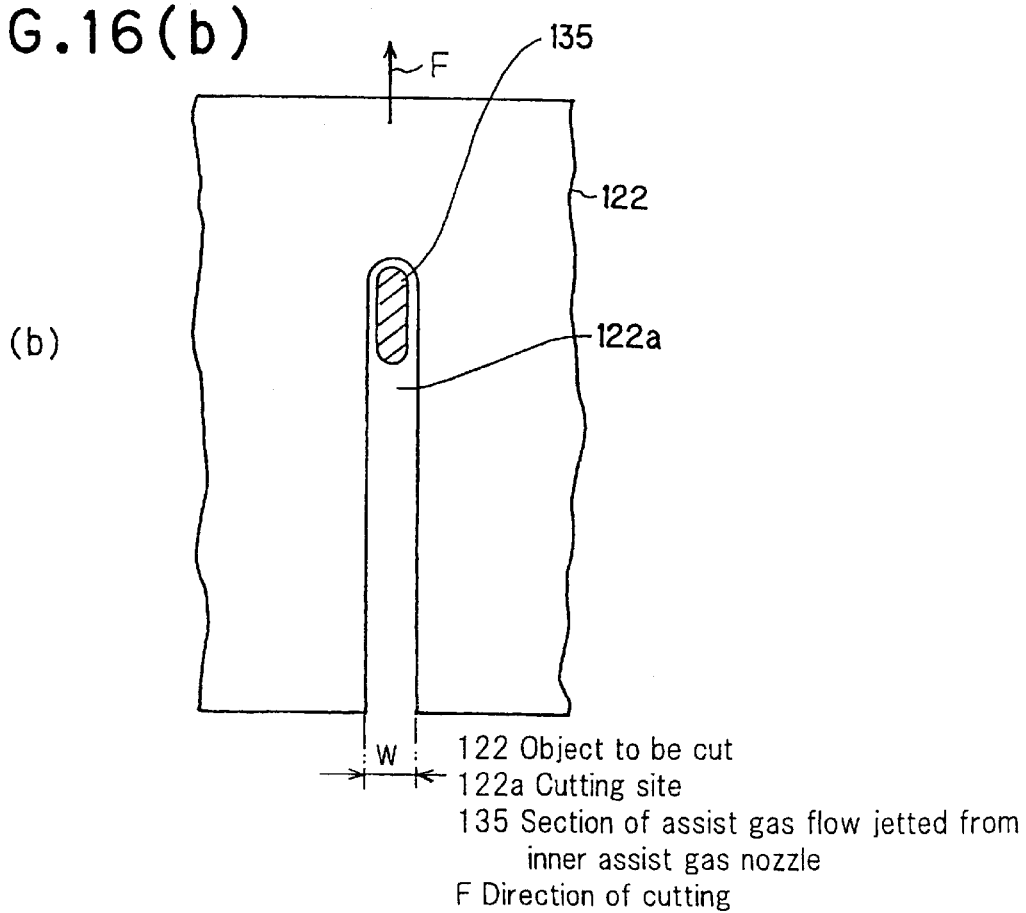
FIG. 16(b) is a view taken on line H—H in FIG. 15 on which a section of an assist gas flow jetted through an inner assist gas nozzle has been superimposed.

As FIG. 16(a) shows, in the laser beam machining head 121 of the present sixth embodiment, a tip opening 134a of the inner assist gas nozzle 134 is thin and elongated along a direction of cutting (a direction of an arrow F). Namely, an opening width $d_i$ of the tip opening 134a is nearly equal to a cutting width w of an object 122 to be cut, and an opening length $d_i$ of the tip opening 134a is larger than the opening width $d_i$. This slender tip opening 134a has a head portion situated above a center c of a tip opening 132 of an outer assist gas nozzle 132 and extending from this position in a direction opposite to the direction of cutting.

Cutting of the object 122 to be cut, by means of a laser beam machine equipped with the laser beam machining head 121 of the present sixth embodiment also gives the same actions and effects as those in the fifth embodiment, although its detailed description will be omitted.

In the present sixth embodiment, moreover, the tip opening 134a of the inner assist gas nozzle 134 is in such a slender shape that its opening width $d_i$ is nearly equal to the cutting width w of the object 122 to be cut, and its opening length $d_i$ is larger than the opening width $d_i$. Thus, as is clear from a section 135 of an assist gas flow shown in FIG. 16(b), most of an assist gas jetted from the inner assist gas nozzle 134 can be fed into a cutting site 122a. Further, a larger channel area than in the fifth embodiment can be provided, so that the flow rate of the assist gas jetted from the inner assist gas nozzle 134 (fed into the cutting site 122a) can be increased.

For example, suppose that the amount of the assist gas fed from the assist gas supply device is adjusted to make the velocity of the assist gas jetted from the inner assist gas nozzle 134 in the present sixth embodiment equal to the velocity of the assist gas jetted from the inner assist gas nozzle 134 in the aforementioned fifth embodiment. In this case, since the channel area is different between the sixth embodiment and the fifth embodiment, the flow rate of the assist gas jetted from the inner assist gas nozzle 134 in the former becomes greater than the flow rate of the assist gas jetted from the inner assist gas nozzle 134 in the latter.

As noted above, the present sixth embodiment can feed the assist gas efficiently into the cutting site 122a, raise the jet velocity of the assist gas, and increase the jet flow rate of the assist gas. Thus, the ability of the assist gas to remove fused metal is even higher than in the fifth embodiment. Consequently, the cutting ability for the object 122 to be cut increases further.

[Seventh Embodiment]

Figure 17:
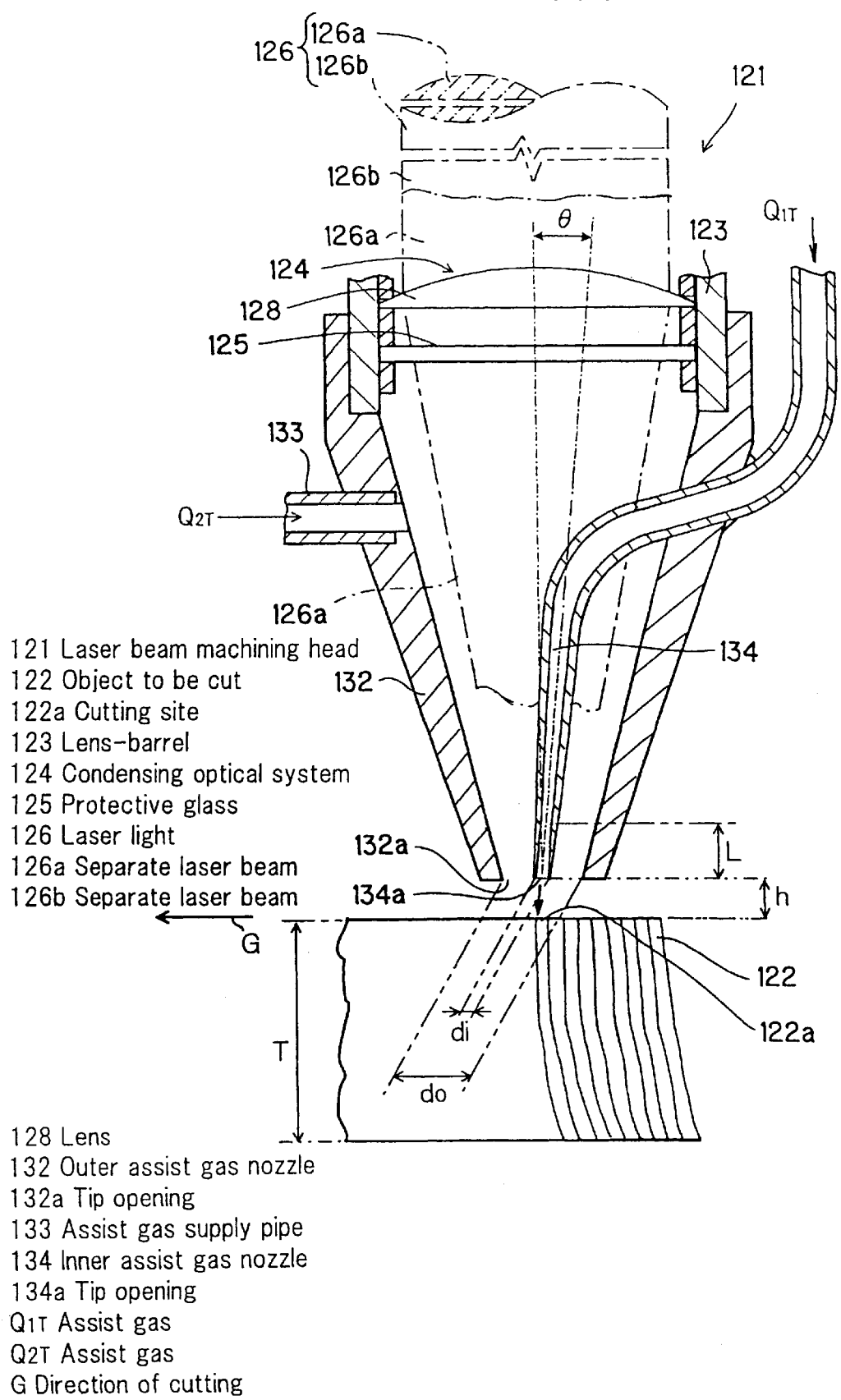
FIG. 17 is a vertical sectional view showing a constitution of a tip portion of a laser beam machining head according to a seventh embodiment of the present invention.

FIG. 17 is a vertical sectional view showing a constitution of a tip portion of a laser beam machining head according to a seventh embodiment of the present invention.

As shown in FIG. 17, a laser beam machining head 121 according to the present seventh embodiment is the same as the laser beam machining head 121 of the aforementioned fifth embodiment (see FIG. 9), except the constitution concerning an inner assist gas nozzle 134 to be described later on. Thus, a detailed description of this same constitution is omitted here.

As FIG. 17 shows, in the laser beam machining head 121 of the present seventh embodiment, the inner assist gas nozzle 134 is fixed to a side surface of an outer assist gas nozzle 132, with a tip side of the inner assist gas nozzle 134 is inclined at an inclination angle θ in a direction of cutting (FIG. 17 shows cutting in a direction of an arrow G).

That is, laser light 126 is divided by a dividing optical system 127 (see FIG. 12) into two separate laser beams 126a, 126b, and the inner assist gas nozzle 134 is placed between these separate laser beams 126a and 126b. Because of this constitution, a condensing optical system 124 need not be inclined, but only the inner assist gas nozzle 134 can be set in an inclined state.

In the inner assist gas nozzle 134 of the present seventh embodiment, like the aforementioned fifth embodiment, an opening diameter (opening width) $d_i$ of a tip opening 134a is nearly equal to a cutting width of an object 122 to be cut. Of course, the tip opening 134a of the inner assist gas nozzle 134 may be in such a slender, elongated shape along a cutting direction that, as in the aforementioned sixth embodiment, the opening width $d_i$ is nearly equal to the cutting width of the object 122 to be cut, and its opening length is larger than the opening width $d_i$.

Cutting of the object 122 to be cut, by means of a laser beam machine equipped with the laser beam machining head 121 of the present seventh embodiment also gives the same actions and effects as those in the aforementioned fifth embodiment, although its detailed description will be omitted.

In the present seventh embodiment, moreover, the constitution of the inner assist gas nozzle 134 is such that the opening diameter (opening width) $d_i$ of the tip opening 134a is nearly equal to the cutting width of the object 122 to be cut, and the tip side of the inner assist gas nozzle 134 is inclined in the cutting direction. Thus, most of an assist gas jetted from the inner assist gas nozzle 134 can be fed into a cutting site 122a. At this time, the assist gas is blown onto the cutting site 122a (the site of fusion upon irradiation with the separate laser beams 126a, 126b) obliquely relative to the cutting direction.

Figure 27:
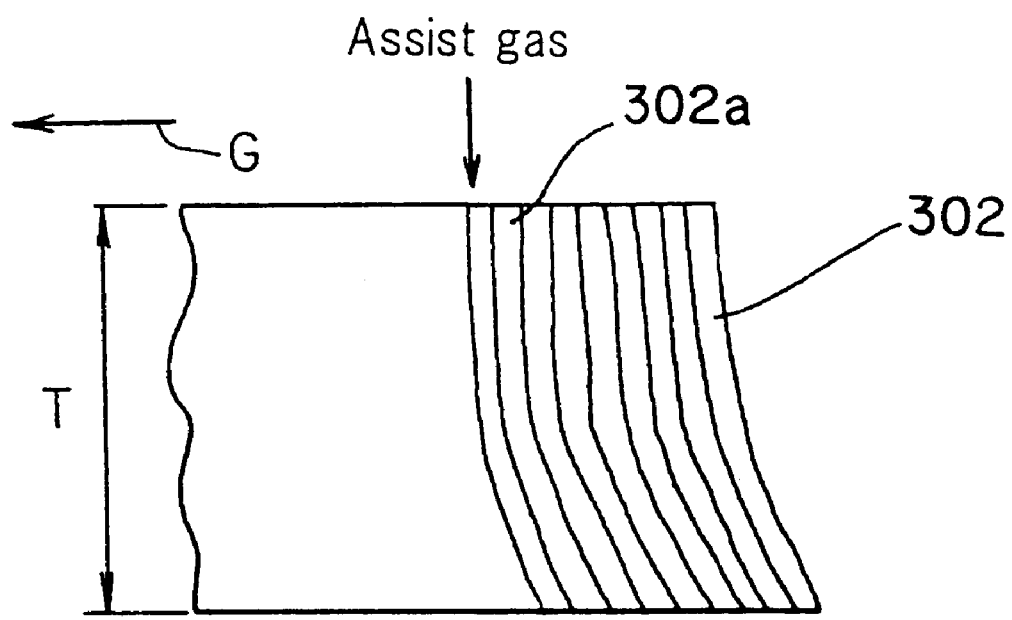
FIG. 27 is an explanation drawing showing a state of a cut surface.

Thus, if the assist gas is jetted just downward (in a direction at right angles to the cutting direction) at the cutting site 122a as shown in FIG. 27, fused metal is relatively prone to flow in a direction opposite to the direction of cutting, so that a substantial thickness of the plate to be cut becomes larger than the actual plate thickness T. Compared with this case, in the present seventh embodiment, the ability of the assist gas to remove fused metal is enhanced to make the fused metal easier to flow downwardly (because of difficulty in flowing of the fused metal in the direction opposite to the cutting direction). As shown in FIG. 17, therefore, the substantial thickness of the plate cut becomes close to the actual plate thickness T, resulting in a further increase in the cutting ability.

[Eighth Embodiment]

Figure 18:
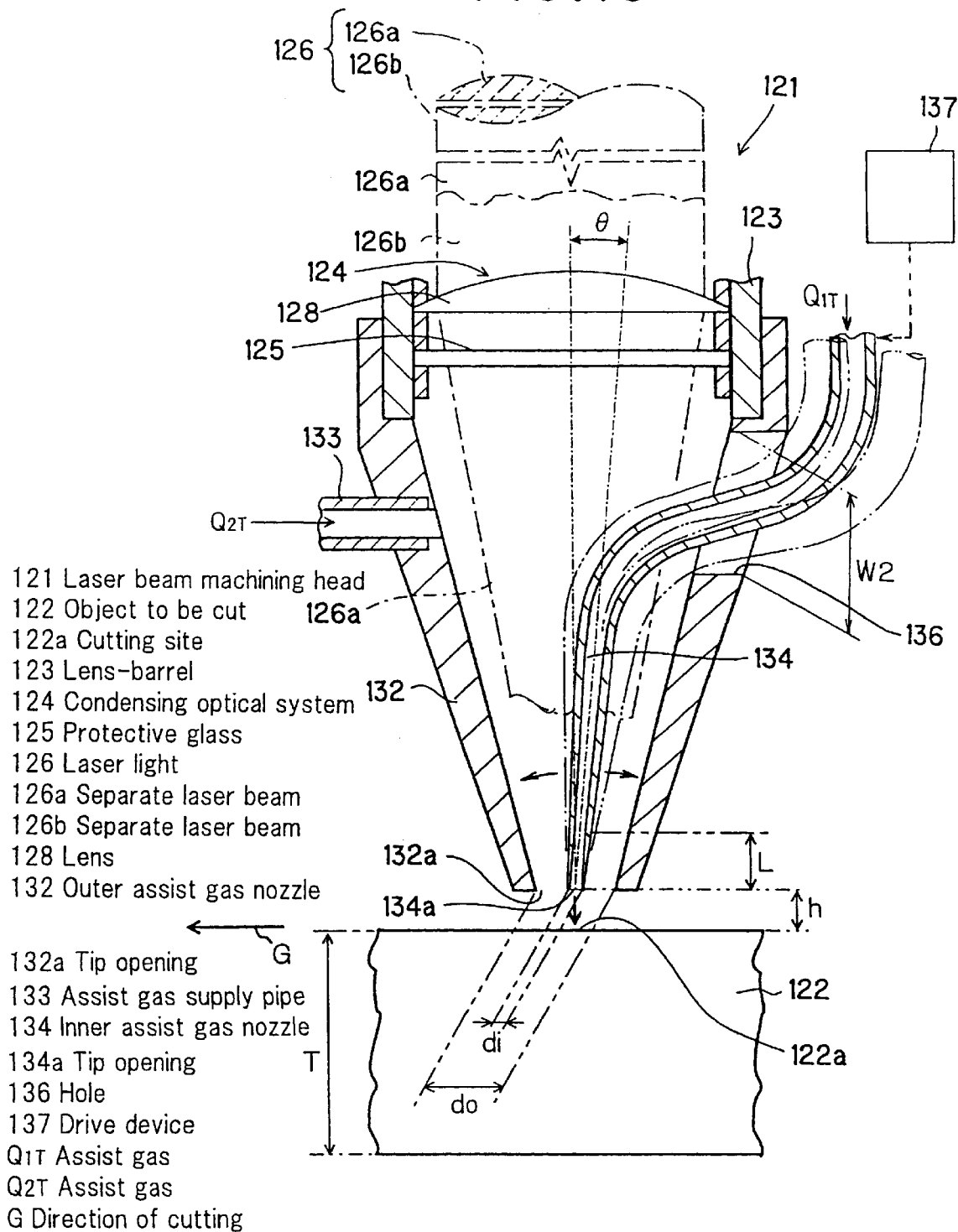
FIG. 18 is a vertical sectional view showing a constitution of a tip portion of a laser beam machining head according to an eighth embodiment of the present invention.

FIG. 18 is a vertical sectional view showing a constitution of a tip portion of a laser beam machining head according to an eighth embodiment of the present invention.

As shown in FIG. 18, a laser beam machining head 121 according to the present eighth embodiment is the same as the laser beam machining head 121 of the aforementioned fifth embodiment (see FIG. 9), except the constitution concerning an inner assist gas nozzle 134 to be described later on. Thus, a detailed description of this same constitution is omitted here. Illustration of a support system for the inner assist gas nozzle 134 is also omitted.

As FIG. 18 shows, in the laser beam machining head 121 of the present eighth embodiment, like the aforementioned seventh embodiment, a tip side of the inner assist gas nozzle 134 is inclined (inclination angle θ) in a direction of cutting (FIG. 18 shows cutting in a direction of an arrow G).

In the seventh embodiment, the inner assist gas nozzle 134 is fixed to the outer assist gas nozzle 132 (the inclination angle θ is fixed). In the present eighth embodiment, on the other hand, the inclination angle θ of the inner assist gas nozzle 134 can be varied independently of a direction of projection of laser beams 126a, 126b.

Concretely, as shown in FIG. 18, a hole 136 having a vertical width $w_2$ larger than the diameter of the inner assist gas nozzle 134 is formed in a side surface of the outer assist gas nozzle 132. The inner assist gas nozzle 134 is inserted into this hole 136. Thus, the inner assist gas nozzle 134 can be changed in the inclination angle θ independently of a condensing optical system 124 and as indicated by a two-dot chain line in FIG. 18, without being restrained by the outer assist gas nozzle 132.

That is, laser light 126 is divided by a dividing optical system 127 (see FIG. 12) into two separate laser beams 126a, 126b, and the inner assist gas nozzle 134 is placed between these separate laser beams 126a and 126b. Because of this constitution, only the inner assist gas nozzle 134 can be inclined independently of the condensing optical system 124, and as in the present eighth embodiment, the inclination angle θ of the inner assist gas nozzle 134 can be varied.

To vary the inclination angle θ of the inner assist gas nozzle 134, a drive device 137, such as an electric motor, a hydraulic cylinder, or a pneumatic air cylinder, and the inner assist gas nozzle 134 may be coupled together via a suitable link mechanism using a gear, shaft or the like, and the inner assist gas nozzle 134 may be pivoted by the drive device 137. Alternatively, an operator may change the inclination angle θ of the inner assist gas nozzle. 134.

In the inner assist gas nozzle 134 of the present eighth embodiment, like the aforementioned fifth embodiment, an opening diameter (opening width) $d_i$ of a tip opening 134a is nearly equal to a cutting width of an object 122 to be cut. Of course, the tip opening 134a of the inner assist gas nozzle 134 may be in such a slender, elongated shape along a cutting direction that, as in the aforementioned seventh embodiment, the opening width $d_i$ is nearly equal to the cutting width of the object 122 to be cut, and its opening length is larger than the opening width $d_i$.

In FIG. 18, the hole 136 formed in the side surface of the outer assist gas nozzle 132 remains open. As such, part of an assist gas introduced from an assist gas supply pipe 133 may leak through the hole 136. For this and other reasons, if protection of the condensing optical system 124 may not be fully ensured, it is desirable to stop up the hole 136, i.e., to close the gap between the inner peripheral surface of the hole 136 and the outer peripheral surface of the inner assist gas nozzle 134, in order to protect the condensing optical system 124 reliably. In this case, the gap may be closed with such a sufficiently flexible member as not to impede the pivoting of the inner assist gas nozzle 134.

Cutting of the object 122 to be cut, by means of a laser beam machine equipped with the laser beam machining head 121 of the present eighth embodiment also gives the same actions and effects as those in the aforementioned fifth and seventh embodiments, although its detailed description will be omitted.

In the eighth embodiment, moreover, the inclination angle θ of the inner assist gas nozzle 134 can be changed. By performing trial cutting with this inclination angle θ varied, for example, an optimal inclination angle θ adapted for the plate thickness, material, etc. of the object 122 to be cut can be selected. Hence, in comparison with the seventh embodiment, the ability of the assist gas to remove fused metal increases further, and the substantial plate cutting thickness becomes close to the actual plate thickness T, resulting in a further increase in the cutting ability.

[Ninth Embodiment]

Figure 19:
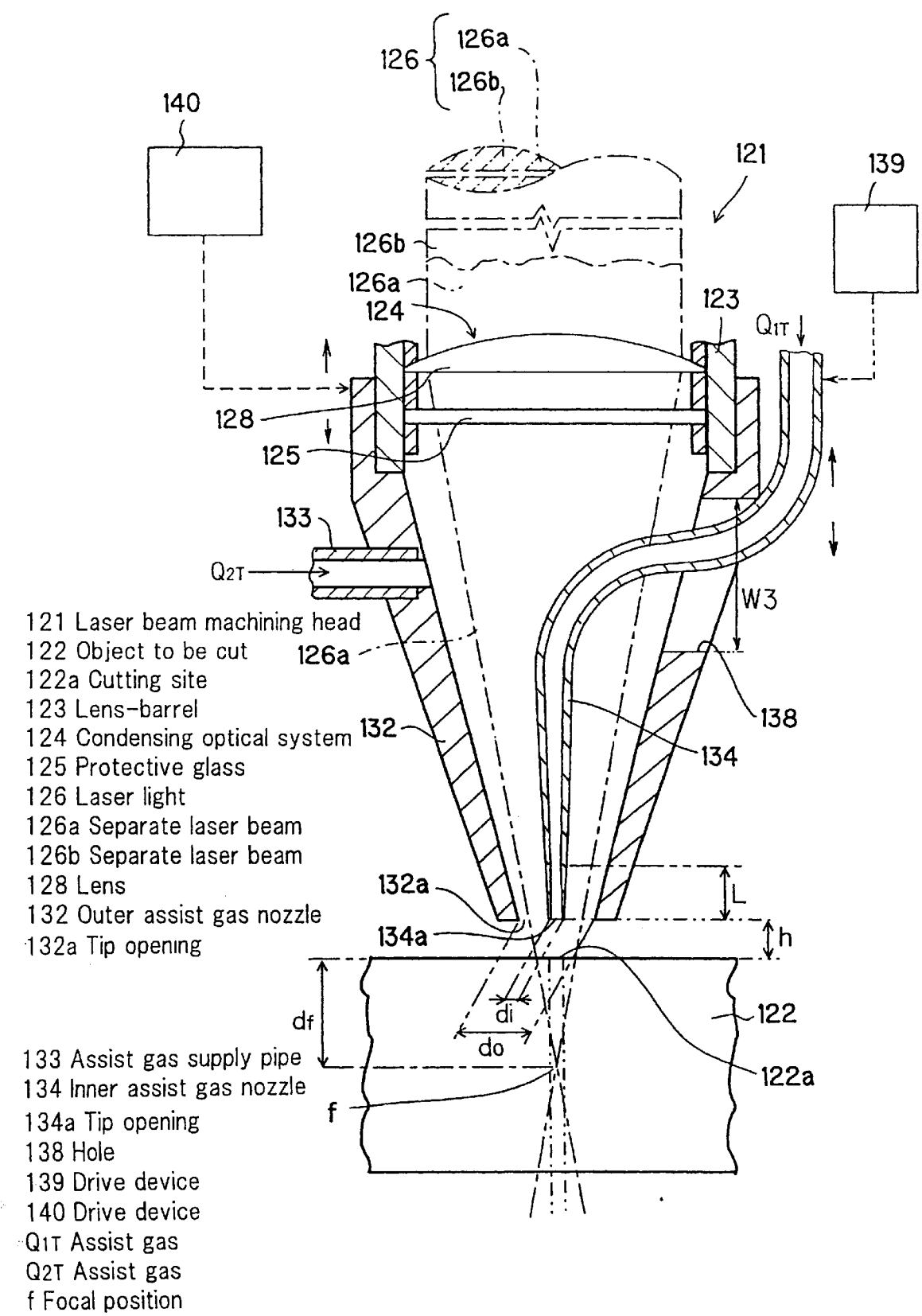
FIG. 19 is a vertical sectional view showing a constitution of a tip portion of a laser beam machining head according to a ninth embodiment of the present invention.
Figure 20:
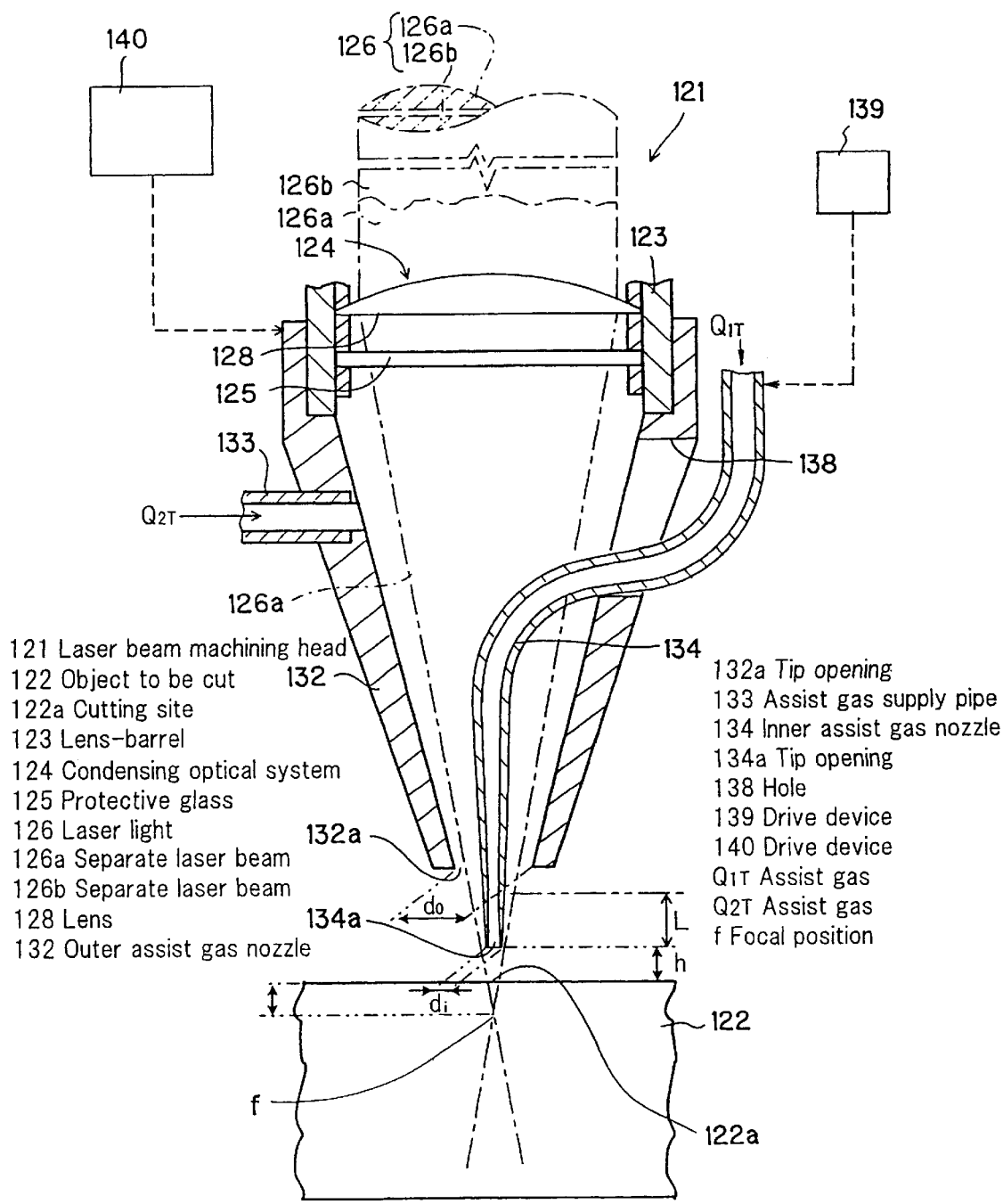
FIG. 20 is another vertical sectional view showing the constitution of the tip portion of the laser beam machining head according to the ninth embodiment of the present invention.

FIGS. 19 and 20 are each a vertical sectional view showing a constitution of a tip portion of a laser beam machining head according to a ninth embodiment of the present invention.

As shown in FIG. 19, a laser beam machining head 121 according to the present ninth embodiment is the same as the laser beam machining head 121 of the aforementioned fifth embodiment (see FIG. 9), except the constitution concerning an inner assist gas nozzle 134 to be described later on. Thus, a detailed description of this same constitution is omitted here. Illustration of a support system for the inner assist gas nozzle 134 is also omitted.

In the aforementioned fifth embodiment, the inner assist gas nozzle 134 is fixed to an outer assist gas nozzle 132. In the present ninth embodiment, on the other hand, the relative positions of the inner assist gas nozzle 134 and the object 122 to be cut (spacing h between the front end of the inner assist gas nozzle 134 and the surface of the object 122 to be cut) can be varied independently of the relative positions of a focal position f of a condensing optical system 124 and the object 122 to be cut (distance $d_f$ from the surface of the object 122 to be cut to the focal position f); or the relative positions of the focal position f of the condensing optical system 124 and the object 122 to be cut can be varied independently of the relative positions of the inner assist gas nozzle 134 and the object 122 to be cut.

Concretely, as shown in FIG. 19, a hole 138 having a vertical width $W_3$ sufficiently larger than the outer diameter of the inner assist gas nozzle 134 is formed in a side surface of the outer assist gas nozzle 132. The inner assist gas nozzle 134 is inserted through this hole 138.

Thus, as indicated by a two-dot chain line in FIG. 19, the vertical position of the inner assist gas nozzle 134 can be changed without being restrained by the outer assist gas nozzle 132, i.e., independently of the condensing optical system 124, whereby the relative positions of the inner assist gas nozzle 134 and the object 122 to be cut (spacing h) can be changed. Alternatively, as indicated by a two-dot chain line in FIG. 20, the vertical position of the condensing optical system 124 is changed independently of the inner assist gas nozzle 134, whereby the relative positions of the focal position f of the condensing optical system 124 and the object 122 to be cut (distance $d_f$) can be changed. FIG. 20 shows a case in which the distance $d_f$ has been made small.

That is, laser light 126 is divided by a dividing optical system 127 (see FIG. 12) into two separate laser beams 126a, 126b, and the inner assist gas nozzle 134 is placed between these separate laser beams 126a and 126b. Because of this constitution, only the inner assist gas nozzle 134 can be moved up and down independently of the condensing optical system 124, or only the condensing optical system 124 can be moved up and down independently of the inner assist gas nozzle 134.

To move the inner assist gas nozzle 134 vertically, a drive device 139, such as an electric motor or a cylinder, and the inner assist gas nozzle 134 may be coupled together via a suitable link mechanism using a gear, shaft or the like, and the inner assist gas nozzle 134 may be moved vertically by the drive device 139. Alternatively, the inner assist gas nozzle 134 may be moved vertically by a manual force. Similarly, to move the condensing optical system 124 vertically, either a drive device 140, such as an electric motor or a cylinder, or a manual force may be employed.

In this case, if only the inner assist gas nozzle 134 is moved downward, or only the condensing optical system 124 is moved upward, then the inner assist gas nozzle 134 will approach the separate laser beams 126a, 126b. To avoid interference between the inner assist gas nozzle 134 and the separate laser beams 126a, 126b, it is necessary to set the distance between the separate laser beams 126a and 126b, or the outer diameter of the inner assist gas nozzle 134.

In the inner assist gas nozzle 134 of the present ninth embodiment, like the aforementioned fifth embodiment, an opening diameter (opening width) $d_i$ of a tip opening 134a is nearly equal to a cutting width w of the object 122 to be cut. Of course, the tip opening 134a of the inner assist gas nozzle 134 may be in such a slender, elongated shape along a cutting direction (a direction perpendicular to the sheet face of FIGS. 19 and 20) that, as in the aforementioned seventh embodiment, the opening width $d_i$ is nearly equal to the cutting width w of the object 122 to be cut, and its opening length is larger than the opening width $d_i$.

In FIGS. 19 and 20, the hole 138 formed in the side surface of the outer assist gas nozzle 132 remains open. As such, part of an assist gas introduced from an assist gas supply pipe 133 may leak through the hole 138. For this and other reasons, if protection of the condensing optical system 124 may not be fully ensured, it is desirable to stop up the hole 138, i.e., to close the gap between the inner peripheral surface of the hole 138 and the outer peripheral surface of the inner assist gas nozzle 134, in order to protect the condensing optical system 124 reliably. In this case, the gap may be closed with such a sufficiently flexible member as not to impede the vertical movement of the inner assist gas nozzle 134 or the condensing optical system 124.

Cutting of the object 122 to be cut, by means of a laser beam machine equipped with the laser beam machining head 121 of the present ninth embodiment also gives the same actions and effects as those in the aforementioned fifth embodiment, although its detailed description will be omitted.

In the ninth embodiment, moreover, the relative positions of the inner assist gas nozzle 134 and the object 122 to be cut (spacing h) can be varied independently of the relative positions of the focal position f of the condensing optical system 124 and the object 122 to be cut (distance $d_f$); or the relative positions of the focal position f of the condensing optical system 124 and the object 122 to be cut can be varied independently of the relative positions of the inner assist gas nozzle 134 and the object 122 to be cut. Thus, the following effects are obtained:

The relative positions of the inner assist gas nozzle 134 and the object 122 to be cut (spacing h) can be adjusted to optimal positions without inducing changes in the relative positions of the focal position f of the condensing optical system 124 and the object 122 to be cut (distance $d_f$). That is, the inner assist gas nozzle 134 can be brought as close as possible to the object 122 to be cut, such that the interference between the inner assist gas nozzle 134 and the object 122 to be cut can be avoided. This increases the ability of the assist gas to remove fused metal, thereby increasing the cutting ability. Alternatively, the relative positions of the focal position f of the condensing optical system 124 and the object 122 to be cut (distance $d_f$) can be adjusted to optimal positions adapted to the material, thickness, etc. of the object 122 to be cut, without inducing changes in the relative positions of the inner assist gas nozzle 134 and the object 122 to be cut (spacing h). This also results in an increase in the cutting ability.

The laser beam machining head of the present invention is not restricted to a laser beam machine using a YAG laser oscillator, but can also be applied to a laser beam machine using other laser oscillator.

The inner assist gas nozzle 134 in each of the fifth to ninth embodiments is a straight nozzle having a tip portion L whose inner diameter is constant ($d_i$). However, the inner diameter of this tip portion need not be constant, but the nozzle may have a slightly widened tip side. Such a nozzle with a widened tip side is known as a divergent nozzle. When the divergent nozzle is used as the inner assist gas nozzle 134, the flow velocity of the assist gas can be made the sound velocity or higher.

As a method for providing the inner assist gas nozzle 134 between the separate laser beams 126a and 126b, it is conceivable to pierce the center of the concave roof mirror 129 and the center of each lens 128 of the condensing optical system 124 shown in FIG. 11, and insert the inner assist gas nozzle 134 of a straight shape into the resulting holes. In this case, however, the resulting laser beam machining head is expensive because of man-hours in production, and so forth. Besides, the optical system is liable to be damaged by the inner assist gas nozzle 134. In view of these disadvantages, it is recommendable to pass the inner assist gas nozzle 134 through the outer assist gas nozzle 132, and provide it between the separate laser beams 126a and 126b at the condensing site for the separate laser beams 126a, 126b (the laser light exit side of the condensing optical system 124), as described in the fifth to ninth embodiments.

The fifth to ninth embodiments have been described in connection with cutting of a workpiece. However, the fifth to ninth embodiments, in particular, are effective when applied to piercing of a workpiece. In this case, the opening width (opening diameter) $d_i$ of the tip portion of the inner assist gas nozzle 134 is rendered nearly equal to the hole diameter of the piercing site of the workpiece.

As have been described in detail together with the embodiments, according to a first aspect of the present invention, a convex roof mirror and a concave roof mirror are combined to divide a laser beam in two. Thus, the laser beam at a condensing portion can be divided into two parts.

According to a second aspect of the present invention, a laser beam is divided in two so that no laser beam is projected onto a filler wire feed pipe or an electrode holding pipe for various arcs such as TIG, MAG and plasma arcs. Thus, laser beam can be efficiently and intensively projected onto a base material for welding. Furthermore, the filler wire feed pipe or the electrode holding pipe for various arcs such as TIG, MAG and plasma arcs is coaxial with the laser beam. Thus, satisfactory welding can be performed for an object of a complicated shape, such as a three-dimensional shape, without hindrance to workability.

According to a third aspect and a fourth aspect of the present invention, a filler wire is fed from outside separate laser beams to a beam condensing position via a filler wire guide in the spacing between the separate laser beams, and an electrode is brought close to the beam condensing position by a water flow pipe or an electrode holding pipe. Thus, there is no need to use a holed optical system as the optical system, so that the resulting apparatus is inexpensive.

According to a fifth aspect of the present invention, the position of an optical fiber for laser beam transmission, or the convex roof mirror and the concave roof mirror can be moved relative to the center of lenses in two directions perpendicular to the optical axis in a plane perpendicular to the optical axis. Thus, the ratio of the intensities of the two separate laser beams, or the position of the laser beam can be changed as desired.

According to a sixth aspect of the present invention, a laser beam machining head of a laser beam machine for projecting laser light onto a workpiece, and also blowing an assist gas at the workpiece to cut or pierce the workpiece, comprises:
 a dividing optical system for dividing the laser light into at least two separate laser beams, and providing spacing between the separate laser beams;
 a condensing optical system for condensing the separate laser beams into condensed laser light, and projecting the condensed laser light onto a cutting site or a piercing site of the workpiece; and
 an inner assist gas nozzle placed between the separate laser beams, a width of an opening of a tip portion of the inner assist gas nozzle being nearly equal to a cutting width of the cutting site or a hole diameter of the piercing site.

Thus, the following effects are obtained:

The assist gas jetted from the inner assist gas nozzle is mostly fed into the cutting site or the piercing site, because the opening diameter of the inner assist gas nozzle is nearly equal to the cutting width or the hole diameter. In other words, the assist gas can be fed with high efficiency into the cutting site or the piercing site. Thus, the amount of the assist gas fed into the cutting site or the piercing site can be increased markedly in comparison with the earlier technologies. Moreover, the opening diameter of the inner assist gas nozzle is so small that the jet velocity of the assist gas jetted from the inner assist gas nozzle becomes much higher than in the earlier technologies. The gas pressure can also be raised, without restrictions imposed by the pressure resistant strength of the optical parts. Because of these advantages, the kinetic energy of the assist gas fed into the cutting site or the piercing site becomes great. Thus, the ability of the assist gas to remove fused metal increases remarkably, and the cutting ability or piercing ability is enhanced markedly.

According to a seventh aspect of the present invention, a laser beam machining head of a laser beam machine for projecting laser light onto a workpiece, and also blowing an assist gas at the workpiece to cut the workpiece, comprises:
- a dividing optical system for dividing the laser light into at least two separate laser beams, and providing spacing between the separate laser beams;
- a condensing optical system for condensing the separate laser beams into condensed laser light, and projecting the condensed laser light onto a cutting site of the workpiece; and
- an inner assist gas nozzle placed between the separate laser beams, a width of an opening of a tip portion of the inner assist gas nozzle being nearly equal to a width of the cutting site, and a length of the opening of the tip portion being larger than the width of the opening.

Thus, the following effects are obtained:

The tip opening of the inner assist gas nozzle is in such a slender shape that its opening width is nearly equal to the cutting width of the object to be cut, and its opening length is larger than the opening width. Thus, most of an assist gas jetted from the inner assist gas nozzle can be fed into the cutting site. Further, the channel area is increased, so that the flow rate of the assist gas jetted from the inner assist gas nozzle (fed into the cutting site) can be increased. In short, this aspect of the invention can feed the assist gas efficiently into the cutting site, raise the jet velocity of the assist gas, and increase the jet flow rate of the assist gas. Thus, the ability of the assist gas to remove fused metal is further increased. Consequently, the cutting ability increases further.

According to an eighth aspect of the present invention, a laser beam machining head of a laser beam machine for projecting laser light onto a workpiece, and also blowing an assist gas at the workpiece to cut the workpiece, comprises:
- a dividing optical system for dividing the laser light into at least two separate laser beams, and providing spacing between the separate laser beams;
- a condensing optical system for condensing the separate laser beams into condensed laser light, and projecting the condensed laser light onto a cutting site of the workpiece; and
- an inner assist gas nozzle placed between the separate laser beams, a width of an opening of a tip portion of the inner assist gas nozzle being nearly equal to a cutting width of the cutting site, and a tip side of the inner assist gas nozzle being inclined in a direction of cutting.

Thus, the following effects are obtained:

The constitution of the inner assist gas nozzle is such that the opening width of the tip opening is nearly equal to the cutting width of the object to be cut, and the tip side of the inner assist gas nozzle is inclined in the cutting direction. Thus, most of an assist gas jetted from the inner assist gas nozzle can be fed into the cutting site. At this time, the assist gas is blown onto the cutting site (the site of fusion upon irradiation with the separate laser beams) obliquely relative to the cutting direction. Thus, the ability of the assist gas to remove fused metal is enhanced to make the fused metal easier to flow downwardly (because of difficulty in flowing of the fused metal in the direction opposite to the cutting direction). Therefore, the substantial thickness of the plate to be cut becomes close to the actual plate thickness, resulting in a further increase in the cutting ability.

According to a ninth aspect of the present invention, the laser beam machining head of the eighth aspect of the invention is such that an angle of inclination of the inner assist gas nozzle can be varied independently of a direction of projection of the laser light.

Thus, the following effects are obtained:

The inclination angle of the inner assist gas nozzle can be changed. By performing trial cutting with this inclination angle varied, for example, an optimal inclination angle adapted for the plate thickness, material, etc. of the object to be cut can be selected. Hence, the ability of the assist gas to remove fused metal increases further, and the substantial plate cutting thickness becomes close to the actual plate thickness, resulting in a further increase in the cutting ability.

According to a tenth aspect of the present invention, a laser beam machining head of a laser beam machine for projecting laser light onto a workpiece, and also blowing an assist gas at the workpiece to cut or pierce the workpiece, comprises:
- a dividing optical system for dividing the laser light into at least two separate laser beams, and providing spacing between the separate laser beams;
- a condensing optical system for condensing the separate laser beams into condensed laser light, and projecting the condensed laser light onto a cutting site or a piercing site of the workpiece; and
- an inner assist gas nozzle placed between the separate laser beams, a width of an opening of a tip portion of the inner assist gas nozzle being nearly equal to a cutting width of the cutting site, or a hole diameter of the piercing site, wherein:
- relative positions of the inner assist gas nozzle and the workpiece can be varied independently of relative positions of a focal position of the condensing optical system and the workpiece; or the relative positions of the focal position of the condensing optical system and the workpiece can be varied independently of the relative positions of the inner assist gas nozzle and the workpiece.

Thus, the following effects are obtained:

The relative positions of the inner assist gas nozzle and the workpiece can be adjusted to optimal positions without inducing changes in the relative positions of the focal position of the condensing optical system and the workpiece. That is, the inner assist gas nozzle can be brought as close to the workpiece as possible such that interference between the inner assist gas nozzle and the workpiece can be avoided. This increases the ability of the assist gas to remove fused metal, thereby increasing the machining ability. Alternatively, the relative positions of the focal position of the condensing optical system and the workpiece can be adjusted to optimal positions adapted to the material, thickness, etc. of the workpiece, without inducing changes in the relative positions of the inner assist gas nozzle and the workpiece. This also results in an increase in the machining ability.

According to an eleventh aspect of the present invention, in the laser beam machining head described in the sixth, seventh, eighth, ninth or tenth aspect of the invention, an outer assist gas is provided at an exit side of the condensing optical system so as to surround the separate laser beams launched from the condensing optical system, and the assist gas is also jetted through a tip opening of the outer assist gas nozzle.

Thus, the following effects are obtained:

Since the outer assist gas nozzle is provided, and the assist gas is jetted from this outer assist gas nozzle as well, protection of the condensing optical system can be ensured.

This invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A laser beam machining head of a laser beam machine for projecting laser light onto a workpiece, and also blowing an assist gas at the workpiece to cut or pierce the workpiece, comprising:
   a dividing optical system for dividing the laser light into at least two separate laser beams, and providing spacing between the separate laser beams;
   a condensing optical system for condensing the separate laser beams into condensed laser light, and projecting the condensed laser light onto a cutting site or a piercing site of the workpiece; and
   an inner assist gas nozzle placed between the separate laser beams, a width of an opening of a tip portion of the inner assist gas nozzle being nearly equal to a cutting width of the cutting site, or a hole diameter of the piercing site.

2. The laser beam machining head of claim 1, wherein:
   an outer assist gas nozzle is provided at an exit side of the condensing optical system so as to surround the separate laser beams launched from the condensing optical system, and the assist gas is also jetted through a tip opening of the outer assist gas nozzle.

3. A laser beam machining head of a laser beam machine for projecting laser light onto a workpiece, and also blowing an assist gas at the workpiece to cut the workpiece, comprising:
   a dividing optical system for dividing the laser light into at least two separate laser beams, and providing spacing between the separate laser beams;
   a condensing optical system for condensing the separate laser beams into condensed laser light, and projecting the condensed laser light onto a cutting site of the workpiece; and
   an inner assist gas nozzle placed between the separate laser beams, a width of an opening of a tip portion of the inner assist gas nozzle being nearly equal to a cutting width of the cutting site, and a length of the opening of the tip portion being larger than the width of the opening.

4. The laser beam machining head of claim 3, wherein:
   an outer assist gas nozzle is provided at an exit side of the condensing optical system so as to surround the separate laser beams launched from the condensing optical system, and the assist gas is also jetted through a tip opening of the outer assist gas nozzle.

5. A laser beam machining head of a laser beam machine for projecting laser light onto a workpiece, and also blowing an assist gas at the workpiece to cut the workpiece, comprising:
   a dividing optical system for dividing the laser light into at least two separate laser beams, and providing spacing between the separate laser beams;
   a condensing optical system for condensing the separate laser beams into condensed laser light, and projecting the condensed laser light onto a cutting site of the workpiece; and
   an inner assist gas nozzle placed between the separate laser beams, a width of an opening of a tip portion of the inner assist gas nozzle being nearly equal to a cutting width of the cutting site, and a tip side of the inner assist gas nozzle being inclined in a direction of cutting.

6. The laser beam machining head of claim 5, wherein:
   an outer assist gas nozzle is provided at an exit side of the condensing optical system so as to surround the separate laser beams launched from the condensing optical system, and the assist gas is also jetted through a tip opening of the outer assist gas nozzle.

7. The laser beam machining head of claim 5, wherein:
   an angle of inclination of the inner assist gas nozzle can be varied independently of a direction of projection of the laser light.

8. The laser beam machining head of claim 7, wherein:
   an outer assist gas nozzle is provided at an exit side of the condensing optical system so as to surround the separate laser beams launched from the condensing optical system, and the assist gas is also jetted through a tip opening of the outer assist gas nozzle.

9. A laser beam machining head of a laser beam machine for projecting laser light onto a workpiece, and also blowing an assist gas at the workpiece to cut or pierce the workpiece, comprising:
   a dividing optical system for dividing the laser light into at least two separate laser beams, and providing spacing between the separate laser beams;
   a condensing optical system for condensing the separate laser beams into condensed laser light, and projecting the condensed laser light onto a cutting site or a piercing site of the workpiece; and
   an inner assist gas nozzle placed between the separate laser beams, a width of an opening of a tip portion of the inner assist gas nozzle being nearly equal to a cutting width of the cutting site, or a hole diameter of the piercing site, and wherein:
   relative positions of the inner assist gas nozzle and the workpiece can be varied independently of relative positions of a focal position of the condensing optical system and the workpiece; or the relative positions of the focal position of the condensing optical system and the workpiece can be varied independently of the relative positions of the inner assist gas nozzle and the workpiece.

10. The laser beam machining head of claim 9, wherein:
    an outer assist gas nozzle is provided at an exit side of the condensing optical system so as to surround the separate laser beams launched from the condensing optical system, and the assist gas is also jetted through a tip opening of the outer assist gas nozzle.

* * * * *